under 35 U.S.C. 154(b) by 736 days.

(12) United States Patent
Sasaki et al.

(10) Patent No.: US 7,796,361 B2
(45) Date of Patent: Sep. 14, 2010

(54) MAGNETIC HEAD FOR PERPENDICULAR MAGNETIC RECORDING AND METHOD OF MANUFACTURING SAME

(75) Inventors: Yoshitaka Sasaki, Milpitas, CA (US); Hiroyuki Itoh, Milpitas, CA (US); Hironori Araki, Milpitas, CA (US); Shigeki Tanemura, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 736 days.

(21) Appl. No.: 11/727,371

(22) Filed: Mar. 26, 2007

(65) Prior Publication Data

US 2008/0239567 A1   Oct. 2, 2008

(51) Int. Cl.
*G11B 5/31* (2006.01)
(52) U.S. Cl. .................................. 360/125.13
(58) Field of Classification Search .......... 360/125.02, 360/125.03, 125.06, 125.09, 125.1, 125.11, 360/125.13, 125.14, 125.15
See application file for complete search history.

(56) References Cited

U.S. PATENT DOCUMENTS

| 6,487,041 | B2 * | 11/2002 | Yamanaka et al. ..... 360/125.43 |
| 6,710,973 | B2 | 3/2004 | Okada et al. |
| 6,952,325 | B2 | 10/2005 | Sato et al. |
| 2005/0117251 | A1 * | 6/2005 | Matono et al. ............ 360/126 |
| 2006/0077589 | A1 | 4/2006 | Sasaki et al. |
| 2006/0262453 | A1 * | 11/2006 | Mochizuki et al. ......... 360/125 |
| 2007/0211382 | A1 * | 9/2007 | Mochizuki et al. ......... 360/126 |

FOREIGN PATENT DOCUMENTS

| JP | A-7-141621 | 6/1995 |
| JP | A 2002-092821 | 3/2002 |
| JP | A 2003-203311 | 7/2003 |
| JP | A-2003-242608 | 8/2003 |
| JP | A-2006-331613 | 12/2006 |

OTHER PUBLICATIONS

Nov. 10, 2009 Office Action issued in Japanese Patent Application No. 2007-268763 (with translation).

* cited by examiner

*Primary Examiner*—Angel A. Castro
(74) *Attorney, Agent, or Firm*—Oliff & Berridge, PLC

(57) ABSTRACT

A pole layer has a track width defining portion and a wide portion. The pole layer has: first and second side surfaces located opposite to each other in a first region extending from a medium facing surface to a position at a distance of 10 to 300 nm from the medium facing surface; third and fourth side surfaces located in a second region other than the first region; a fifth side surface located at the boundary between the first and second regions and connecting the first and third side surfaces to each other; and a sixth side surface located at the boundary between the first and second regions and connecting the second and fourth side surfaces to each other. The distance between the first and second side surfaces taken in the track width direction decreases with decreasing distance from the top surface of the substrate. The angle formed by the third and fourth side surfaces with respect to the direction orthogonal to the top surface of the substrate is smaller than that formed by the first and second side surfaces with respect to the direction orthogonal to the top surface of the substrate.

27 Claims, 30 Drawing Sheets

MAGNETIC HEAD FOR PERPENDICULAR MAGNETIC RECORDING AND METHOD OF MANUFACTURING SAME

BACKGROUND OF THE INVENTION

1. Field of the Invention

The present invention relates to a magnetic head for perpendicular magnetic recording that is used for writing data on a recording medium by means of a perpendicular magnetic recording system and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

Like magnetic heads for longitudinal magnetic recording, magnetic heads for perpendicular magnetic recording typically used have a structure in which a reproducing (read) head having a magnetoresistive element (that may be hereinafter called an MR element) for reading and a recording (write) head having an induction-type electromagnetic transducer for writing are stacked on a substrate. The write head incorporates a pole layer that produces a magnetic field in the direction orthogonal to the surface of the recording medium. The pole layer incorporates a track width defining portion and a wide portion, for example. The track width defining portion has an end located in a medium facing surface that faces toward the recording medium. The wide portion is coupled to the other end of the track width defining portion and is greater in width than the track width defining portion. The track width defining portion has a nearly uniform width.

For the perpendicular magnetic recording system, it is an improvement in recording medium and an improvement in write head that mainly contributes to an improvement in recording density. To achieve higher recording density, a reduction in track width and an improvement in writing characteristics are particularly required for the write head. On the other hand, if the track width is reduced, the writing characteristics, such as an overwrite property that is a parameter indicating an overwriting capability, suffer degradation. It is therefore required to achieve better writing characteristics as the track width is reduced. Here, the length of the track width defining portion orthogonal to the medium facing surface is called a neck height. The smaller the neck height, the better is the overwrite property.

A magnetic head used for a magnetic disk drive such as a hard disk drive is typically provided in a slider. The slider has the medium facing surface mentioned above. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt of the magnetic head with respect to the tangent of the circular track, which is called a skew, is created, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, problems arise, such as a phenomenon in which data stored on an adjacent track is erased when data is written on a specific track (that is hereinafter called adjacent track erase) or unwanted writing is performed between adjacent two tracks. To achieve higher recording density, it is required to suppress adjacent track erase. Unwanted writing between adjacent two tracks affects detection of servo signals for alignment of the magnetic head and the signal-to-noise ratio of a read signal.

A technique is known for preventing the problems resulting from the skew described above, as disclosed in U.S. Pat. No. 6,710,973 and JP 2003-203311A, for example. According to this technique, the end face of the track width defining portion located in the medium facing surface is made to have a shape in which the side located backward along the direction of travel of the recording medium (that is, the side located closer to the air inflow end of the slider) is shorter than the opposite side. In magnetic heads, typically, in the medium facing surface the end farther from the substrate is located forward along the direction of travel of the recording medium (that is, located closer to the air outflow end of the slider). Therefore, the above-mentioned shape of the end face of the track width defining portion located in the medium facing surface is such that the side closer to the substrate is shorter than the side farther from the substrate.

Consideration will now be given to a method of forming a pole layer in which the end face of the track width defining portion located in the medium facing surface has a shape in which the side closer to the substrate is shorter than the side farther from the substrate as described above. U.S. Pat. No. 6,710,973 discloses a method of forming a pole layer through the steps of: etching an inorganic insulating film using a patterned resist as a mask to thereby form a groove in the inorganic insulating film; subsequently forming a stopper film; further forming a magnetic film; and flattening the top surface of the magnetic film. JP 2003-203311A discloses a method of forming a pole layer by etching a magnetic layer by using a mask.

In the pole layer formed by the method disclosed in U.S. Pat. No. 6,710,973 or the method disclosed in JP 2003-203311A, a great part of the side surface of the pole layer along the entire perimeter of the pole layer is formed into a surface tilted with respect to the direction orthogonal to the top surface of the substrate. In the pole layer having such a shape, the cross-sectional area of the pole layer taken in the direction orthogonal to the direction in which a magnetic flux flows is smaller, compared with a case in which the entire side surface of the pole layer is orthogonal to the top surface of the substrate. In the pole layer having the above-mentioned shape, it is impossible that a flux of great magnitude is allowed to pass through a portion near the boundary between the track width defining portion and the wide portion, and as a result, write characteristics such as an overwrite property will be degraded. It is therefore inevitable to reduce the neck height of the pole layer having the above-mentioned shape so as to suppress degradation of write characteristics.

It is difficult to precisely form a portion of the side surface of the pole layer near the boundary between the track width defining portion and the wide portion. It is therefore likely that the portion of the pole layer near the boundary between the track width defining portion and the wide portion has such a shape that the width gradually increases as the distance from the medium facing surface increases. As a result, if the neck height is reduced, it is difficult to precisely define the width of the track width defining portion located in the medium facing surface, that is, the track width.

According to the conventional art, the foregoing factors make it difficult to implement a pole layer that is capable of preventing problems resulting from the skew, defining the track width with precision, and improving the write characteristics.

OBJECT AND SUMMARY OF THE INVENTION

It is an object of the invention to provide a magnetic head for perpendicular magnetic recording that is capable of preventing problems resulting from the skew, defining the track width with precision, and improving the write characteristics, and to provide a method of manufacturing such a magnetic head.

A magnetic head for perpendicular magnetic recording of the invention includes: a medium facing surface that faces toward a recording medium; a coil for generating a magnetic field corresponding to data to be written on the recording medium; a pole layer allowing a magnetic flux corresponding to the field generated by the coil to pass therethrough, and generating a write magnetic field for writing the data on the recording medium by means of a perpendicular magnetic recording system; and a substrate on which the pole layer and the coil are stacked.

The pole layer includes: a track width defining portion having an end face located in the medium facing surface and an end opposite to the end face; and a wide portion connected to the end of the track width defining portion and having a width greater than that of the track width defining portion. The end face of the track width defining portion located in the medium facing surface has a first side closest to the substrate and a second side opposite to the first side. The second side defines a track width. The end face of the track width defining portion located in the medium facing surface has a width that decreases with decreasing distance from the first side.

The pole layer further includes: a first side surface and a second side surface located opposite to each other in a first region that extends from the medium facing surface to a position at a distance within a range of 10 to 300 nm inclusive from the medium facing surface; a third side surface and a fourth side surface located in a second region other than the first region; a fifth side surface located at a boundary between the first region and the second region and connecting the first side surface and the third side surface to each other; and a sixth side surface located at the boundary between the first region and the second region and connecting the second side surface and the fourth side surface to each other.

The distance between the first and second side surfaces taken in the direction of track width decreases with decreasing distance from the top surface of the substrate. At the boundary between the first and second regions, the distance between the third and fourth side surfaces taken in the direction of track width at a position closest to the top surface of the substrate is greater than the distance between the first and second side surfaces taken in the direction of track width at a position closest to the top surface of the substrate. Each of the fifth and sixth side surfaces has a width that increases with decreasing distance from the top surface of the substrate.

In the magnetic head of the invention, an angle formed by the third side surface with respect to the direction orthogonal to the top surface of the substrate may be smaller than an angle formed by the first side surface with respect to the direction orthogonal to the top surface of the substrate, and an angle formed by the fourth side surface with respect to the direction orthogonal to the top surface of the substrate may be smaller than an angle formed by the second side surface with respect to the direction orthogonal to the top surface of the substrate.

In the magnetic head of the invention, the distance between the third and fourth side surfaces taken in the direction of track width may increase with decreasing distance from the top surface of the substrate.

In the magnetic head of the invention, the distance from the medium facing surface to the boundary between the first and second regions may be equal to, smaller than, or greater than the distance from the medium facing surface to the boundary between the track width defining portion and the wide portion.

The magnetic head of the invention may further include: an encasing layer made of a nonmagnetic material and having an encasing groove that opens in a top surface thereof; and an encasing groove defining layer disposed on the top surface of the encasing layer and having a penetrating opening contiguous to the encasing groove. In this case, an edge of the opening of the encasing groove defining layer is located directly above an edge of the encasing groove in the top surface of the encasing layer, and at least part of the pole layer is placed in the encasing groove of the encasing layer. The encasing groove defining layer may be made of SiC.

The magnetic head of the invention may further include a bottom forming layer made of a nonmagnetic material, the bottom forming layer being disposed between the encasing layer and the substrate and touching the encasing layer, and at least part of a portion of the encasing groove located in the second region may penetrate the encasing layer. The bottom forming layer may be made of SiC.

The magnetic head of the invention may further include a nonmagnetic film made of a nonmagnetic material and disposed between the encasing layer and the pole layer in the encasing groove.

In the magnetic head of the invention, a portion of the pole layer located in the first region may have a first bottom surface that is a surface closest to the top surface of the substrate, a portion of the pole layer located in the second region may have a second bottom surface that is a surface closest to the top surface of the substrate, and the second bottom surface may be located closer to the top surface of the substrate than the first bottom surface.

In the magnetic head of the invention, the track width defining portion may have a first top surface that is a surface farthest from the top surface of the substrate, the wide portion may have a second top surface that is a surface farthest from the top surface of the substrate, and the second top surface may be located farther from the top surface of the substrate than the first top surface.

A magnetic head for perpendicular magnetic recording manufactured through a manufacturing method of the invention includes a medium facing surface, a coil, a pole layer, an encasing layer, an encasing groove defining layer, and a substrate.

The manufacturing method for the magnetic head of the invention includes: the step of forming a nonmagnetic layer that is to be the encasing layer later by undergoing formation of the encasing groove therein; the step of forming the encasing groove defining layer on the nonmagnetic layer; the first etching step in which an initial groove that is to be the encasing groove later by undergoing etching is formed in the nonmagnetic layer by selectively etching a portion of the nonmagnetic layer exposed from the opening of the encasing groove defining layer; the step of forming a mask on portions of the encasing groove defining layer and the initial groove that are located in the first region; the second etching step of completing the encasing groove by etching a portion of the initial groove that is not covered with the mask by using the mask and the encasing groove defining layer as etching masks; the step of forming the pole layer so that at least part of the pole layer is placed in the encasing groove; and the step of forming the coil.

In the manufacturing method for the magnetic head of the invention, portions of the encasing groove that are to be opposed to the first and second side surfaces of the pole layer are formed through the first etching step, and portions of the encasing groove that are to be opposed to the third to sixth side surfaces of the pole layer are formed through the second etching step.

In the manufacturing method of the invention, an angle formed by the third side surface with respect to the direction orthogonal to the top surface of the substrate may be smaller than an angle formed by the first side surface with respect to the direction orthogonal to the top surface of the substrate, and an angle formed by the fourth side surface with respect to the direction orthogonal to the top surface of the substrate may be smaller than an angle formed by the second side surface with respect to the direction orthogonal to the top surface of the substrate.

In the manufacturing method of the invention, the distance between the third and fourth side surfaces taken in the direction of track width may increase with decreasing distance from the top surface of the substrate.

In the manufacturing method of the invention, the distance from the medium facing surface to the boundary between the first and second regions may be equal to, smaller than, or greater than the distance from the medium facing surface to the boundary between the track width defining portion and the wide portion.

In the manufacturing method of the invention, the encasing groove defining layer may be made of SiC.

The magnetic head manufactured through the manufacturing method of the invention may further include a bottom forming layer made of a nonmagnetic material, the bottom forming layer being disposed between the encasing layer and the substrate and touching the encasing layer, wherein at least part of a portion of the encasing groove located in the second region may penetrate the encasing layer. In this case, the method of the invention further includes the step of forming the bottom forming layer performed before the nonmagnetic layer is formed. The bottom forming layer may be made of SiC. In the first etching step, the nonmagnetic layer may be etched so that an entire bottom of the initial groove reaches a top surface of the bottom forming layer. Alternatively, in the first etching step, the nonmagnetic layer may be etched so that a bottom of a portion of the initial groove located in the second region reaches the top surface of the bottom forming layer while a bottom of a portion of the initial groove located in the first region will not reach the top surface of the bottom forming layer. Another alternative is that, in the first etching step, the nonmagnetic layer may be etched so that the entire bottom of the initial groove will not reach the top surface of the bottom forming layer; and, in the second etching step, the initial groove may be etched so that a bottom of the portion of the encasing groove located in the second region reaches the top surface of the bottom forming layer while a bottom of a portion of the encasing groove located in the first region will not reach the top surface of the bottom forming layer.

The magnetic head manufactured through the manufacturing method of the invention may further include a nonmagnetic film made of a nonmagnetic material and disposed between the encasing layer and the pole layer in the encasing groove. In this case, the manufacturing method of the invention further includes the step of forming the nonmagnetic film performed between the second etching step and the step of forming the pole layer.

In the manufacturing method of the invention, a portion of the pole layer located in the first region may have a first bottom surface that is a surface closest to the top surface of the substrate, a portion of the pole layer located in the second region may have a second bottom surface that is a surface closest to the top surface of the substrate, and the second bottom surface may be located closer to the top surface of the substrate than the first bottom surface.

In the manufacturing method of the invention, the track width defining portion may have a first top surface that is a surface farthest from the top surface of the substrate, the wide portion may have a second top surface that is a surface farthest from the top surface of the substrate, and the second top surface may be located farther from the top surface of the substrate than the first top surface.

According to the magnetic head for perpendicular magnetic recording of the invention or the method of manufacturing the same, the distance between the first and second side surfaces taken in the direction of track width decreases with decreasing distance from the top surface of the substrate. At the boundary between the first and second regions, the distance between the third and fourth side surfaces taken in the direction of track width at the position closest to the top surface of the substrate is greater than the distance between the first and second side surfaces taken in the direction of track width at the position closest to the top surface of the substrate. The width of each of the fifth and sixth side surfaces increases with decreasing distance from the top surface of the substrate. As a result, according to the invention, it is possible to prevent problems resulting from a skew, define the track width with precision, and improve write characteristics.

Other and further objects, features and advantages of the invention will appear more fully from the following description.

DETAILED DESCRIPTION OF THE PREFERRED EMBODIMENTS

First Embodiment

Figure 5:
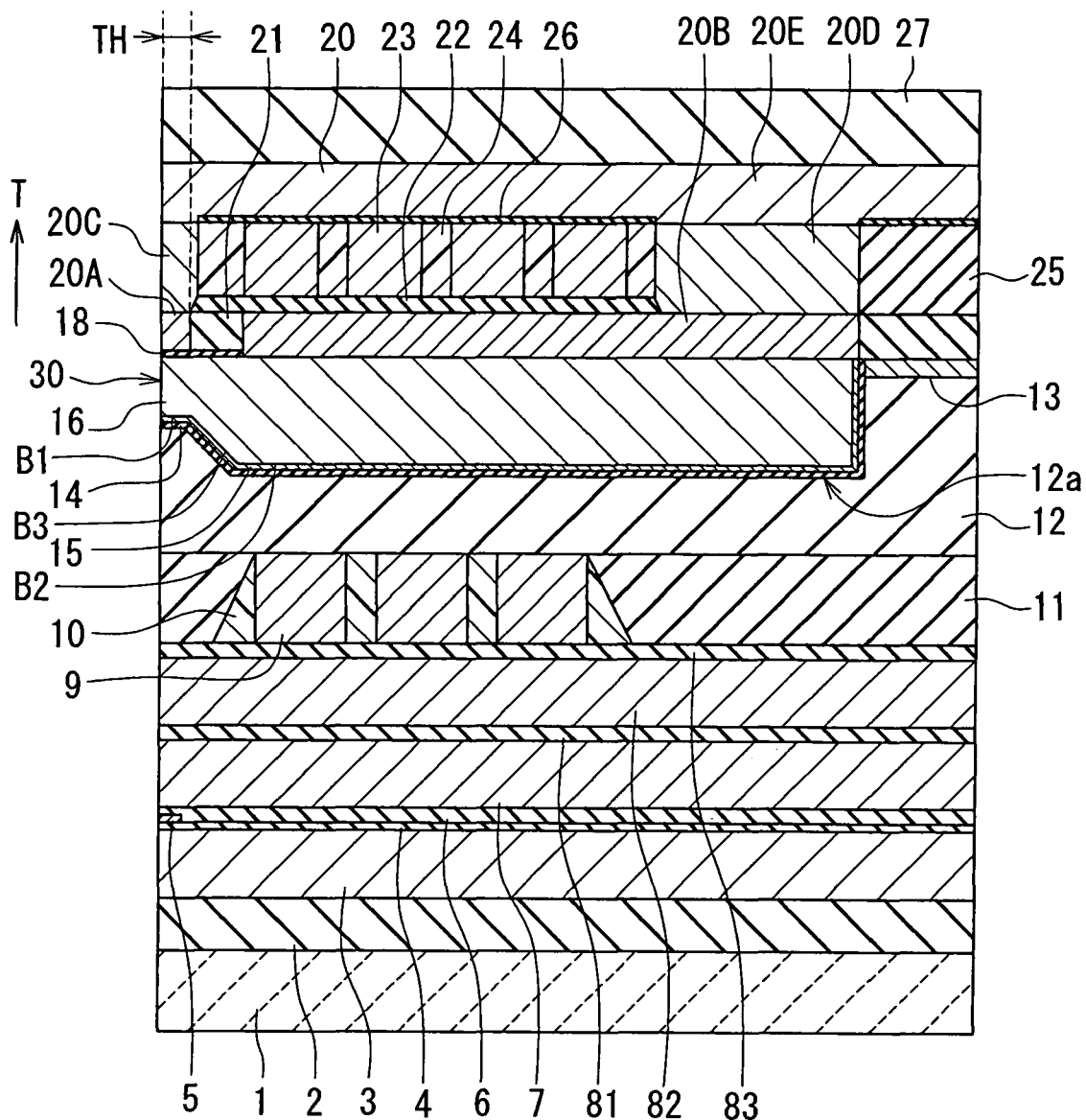
FIG. 5 is a cross-sectional view for illustrating the configuration of the magnetic head of the first embodiment of the invention.
Figure 6:
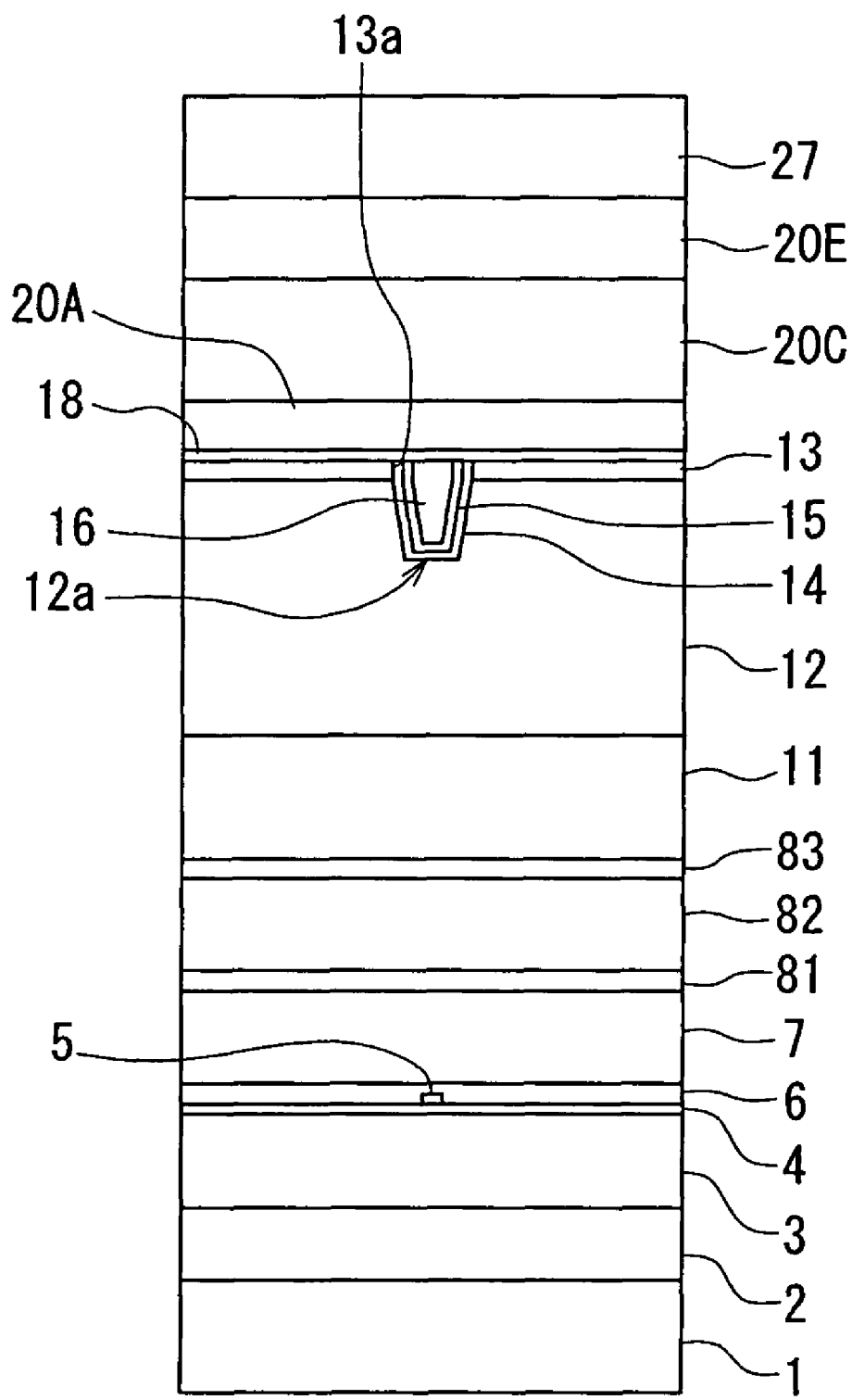
FIG. 6 is a front view of the medium facing surface of the magnetic head of the first embodiment of the invention.

Preferred embodiments of the invention will now be described in detail with reference to the accompanying drawings. Reference is now made to FIG. 5 and FIG. 6 to describe the configuration of a magnetic head for perpendicular magnetic recording of a first embodiment of the invention. FIG. 5 is a cross-sectional view for illustrating the configuration of the magnetic head for perpendicular magnetic recording of the embodiment. FIG. 6 is a front view of the medium facing surface of the magnetic head for perpendicular magnetic recording of the embodiment. FIG. 5 illustrates a cross section orthogonal to the medium facing surface and the plane of a substrate. The arrow indicated with T in FIG. 5 shows the direction of travel of a recording medium.

As shown in FIG. 5 and FIG. 6, the magnetic head for perpendicular magnetic recording (hereinafter simply called the magnetic head) of the embodiment incorporates: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a first top shield layer 7 made of a magnetic material and disposed on the top shield gap film 6.

The MR element 5 has an end located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The magnetic head further incorporates a nonmagnetic layer 81 and a second top shield layer 82 that are disposed on the first top shield layer 7 in this order. The nonmagnetic layer 81 is made of a nonmagnetic material such as alumina. The second top shield layer 82 is made of a magnetic material. The portion from the bottom shield layer 3 to the second top shield layer 82 makes up a read head.

The magnetic head further incorporates: an insulating layer 83 made of an insulating material and disposed on the second top shield layer 82; a coil 9 disposed on the insulating layer 83; an insulating layer 10 made of an insulating material and disposed around the coil 9 and in the space between the respective adjacent turns of the coil 9; and an insulating layer 11 made of an insulating material and disposed around the insulating layer 10. The coil 9 is flat-whorl-shaped. The coil 9 and the insulating layers 10 and 11 have flattened top surfaces. The insulating layers 83 and 11 are made of alumina, for example. The insulating layer 10 is made of photoresist, for example. The coil 9 is made of a conductive material such as copper.

The magnetic head further incorporates an encasing layer 12 made of a nonmagnetic material and disposed on the flattened top surfaces of the coil 9 and the insulating layers 10 and 11. The encasing layer 12 has an encasing groove 12a that opens in the top surface thereof and that accommodates at least part of a pole layer that will be described later. The encasing layer 12 may be made of an insulating material such as alumina, silicon oxide ($SiO_x$), or silicon oxynitride (SiON), or a nonmagnetic metal material such as Ru, Ta, Mo, Ti, W, NiCu, NiB or NiP.

The magnetic head further incorporates an encasing groove defining layer 13 disposed on the top surface of the encasing layer 12. The encasing groove defining layer 13 is a layer for defining the shape of the encasing groove 12a. The encasing groove defining layer 13 has an opening 13a that penetrates, and the edge of the opening 13a is located directly above the edge of the encasing groove 12a in the top surface of the encasing layer 12.

It suffices that the encasing groove defining layer 13 is made of a material whose etch rate is lower than that of a nonmagnetic layer to be the encasing layer 12 when etching is performed to form the encasing groove 12a in the nonmagnetic layer to be the encasing layer 12. For example, in the case in which the nonmagnetic layer to be the encasing layer 12 is made of alumina, the encasing groove defining layer 13 can be made of SiC or a nonmagnetic metal material such as Ta, Mo, W, Ti, Ru, Rh, Re, Pt, Pd, Ir, NiCr, NiP, NiB, $WSi_2$, $TaSi_2$, $TiSi_2$, TiN, or TiW. In the case in which the nonmagnetic layer to be the encasing layer 12 is made of silicon oxide, for example, the material of the encasing groove defining layer 13 can be alumina besides SiC or the above-mentioned nonmagnetic metal material.

In the case in which the encasing groove defining layer 13 is made of SiC, it is possible to prevent the substance removed by etching from depositing on the opening 13a when etching is performed to form the opening 13a in the encasing groove defining layer 13, and it is thereby possible to form the opening 13a with precision. As a result, it is possible to form the encasing groove 12a with precision, too.

The magnetic head further incorporates a nonmagnetic film 14 made of a nonmagnetic material, a polishing stopper layer 15, and the pole layer 16 that are disposed in the encasing groove 12a of the encasing layer 12 and in the opening 13a of the encasing groove defining layer 13. The nonmagnetic film 14 is disposed to touch the surface of the encasing groove 12a. The pole layer 16 is disposed apart from the surface of the encasing groove 12a. The polishing stopper layer 15 is disposed between the nonmagnetic film 14 and the pole layer 16. The polishing stopper layer 15 also functions as a seed layer used for forming the pole layer 16 by plating.

The nonmagnetic film 14 is made of a nonmagnetic material. The material of the nonmagnetic film 14 can be an insulating material or a semiconductor material, for example. The insulating material as the material of the nonmagnetic film 14 can be any of alumina, silicon oxide ($SiO_x$), and silicon oxynitride (SiON), for example. The semiconductor material as the material of the nonmagnetic film 14 can be polycrystalline silicon or amorphous silicon, for example.

The polishing stopper layer 15 is made of a nonmagnetic conductive material. The material of the polishing stopper layer 15 can be the same as the nonmagnetic metal material used for the encasing groove defining layer 13, for example. Each of the nonmagnetic film 14 and the polishing stopper layer 15 corresponds to the nonmagnetic film of the invention.

The pole layer 16 is made of a magnetic metal material. The pole layer 16 can be made of any of CoFeN, CoNiFe, NiFe, and CoFe, for example.

The magnetic head further incorporates a gap layer 18 disposed on the top surfaces of the encasing groove defining layer 13, the nonmagnetic film 14, the polishing stopper layer 15 and the pole layer 16. The gap layer 18 has an opening located away from the medium facing surface 30. The gap layer 18 may be made of an insulating material such as alumina or a nonmagnetic metal material such as Ru, NiCu, Ta, W, NiB or NiP.

The magnetic head further incorporates a shield layer 20. The shield layer 20 has: a first layer 20A disposed on the gap layer 18; a second layer 20C disposed on the first layer 20A; a yoke layer 20B disposed on a portion of the pole layer 16 where the opening of the gap layer 18 is formed; a coupling layer 20D disposed on the yoke layer 20B; and a third layer 20E disposed to couple the second layer 20C to the coupling layer 20D. The first layer 20A, the yoke layer 20B, the second layer 20C, the coupling layer 20D and the third layer 20E are each made of a magnetic material. These layers 20A to 20E can be made of any of CoFeN, CoNiFe, NiFe and CoFe, for example.

The magnetic head further incorporates a nonmagnetic layer 21 made of a nonmagnetic material and disposed around the yoke layer 20B. A portion of the nonmagnetic layer 21 is disposed on a side of the first layer 20A. For example, the nonmagnetic layer 21 is made of an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be a refractory metal such as Ta, Mo, Nb, W, Cr, Ru, NiCu, Pd, or Hf.

The magnetic head further incorporates: an insulating layer 22 disposed on regions of the top surfaces of the yoke layer 20B and the nonmagnetic layer 21 in which a coil 23 described later is disposed; the coil 23 disposed on the insulating layer 22; an insulating layer 24 disposed around the coil 23 and in the space between the respective adjacent turns of the coil 23; an insulating layer 25 disposed around the insulating layer 24; and an insulating layer 26 disposed on the coil 23 and the insulating layers 24 and 25. The coil 23 is flat-whorl-shaped. A portion of the coil 23 passes between the second layer 20C and the coupling layer 20D. The coil 23 is made of a conductive material such as copper. The second layer 20C, the coupling layer 20D and the insulating layers 24 and 25 have flattened top surfaces. The insulating layer 24 is made of photoresist, for example. The insulating layers 22, 25 and 26 are made of alumina, for example.

The portion from the coil 9 to the third layer 20E of the shield layer 20 makes up a write head. The magnetic head further incorporates a protection layer 27 formed to cover the shield layer 20. The protection layer 27 is made of alumina, for example.

As described so far, the magnetic head of the embodiment includes the medium facing surface 30 that faces toward a recording medium, the read head, and the write head. The read head and the write head are stacked on the substrate 1. The read head is located backward along the direction T of travel of the recording medium (that is, located closer to the air inflow end of the slider). The write head is located forward along the direction T of travel of the recording medium (that is, located closer to the air outflow end of the slider).

The read head incorporates the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further incorporates: the bottom shield gap film 4 disposed between the MR element 5 and the bottom shield layer 3; and the top shield gap film 6 disposed between the MR element 5 and the top shield layer 7.

The write head incorporates the coil 9, the encasing layer 12, the encasing groove defining layer 13, the nonmagnetic film 14, the polishing stopper layer 15, the pole layer 16, the gap layer 18, the shield layer 20, and the coil 23. The coils 9 and 23 generate a magnetic field corresponding to data to be written on the recording medium. The coil 9 is not a component requisite for the write head and may be omitted. The nonmagnetic film 14 may also be omitted.

The pole layer 16 has an end face located in the medium facing surface 30. The pole layer 16 allows a magnetic flux corresponding to the field generated by the coil 23 to pass therethrough and generates a write magnetic field for writing the data on the medium by means of the perpendicular magnetic recording system.

The shield layer 20 has an end face located in the medium facing surface 30, and has a portion located away from the medium facing surface 30 and coupled to the pole layer 16. The gap layer 18 is made of a nonmagnetic material and is provided between the pole layer 16 and the shield layer 20.

In the medium facing surface 30, the end face of the shield layer 20 is disposed forward of the end face of the pole layer 16 along the direction T of travel of the recording medium with a specific distance provided therebetween by the thickness of the gap layer 18. The thickness of the gap layer 18 is within a range of 20 to 50 nm inclusive, for example. At least part of the coil 23 is disposed between the pole layer 16 and the shield layer 20 and insulated from the pole layer 16 and the shield layer 20.

At least part of the pole layer 16 is disposed in the encasing groove 12a of the encasing layer 12. To be specific, in the embodiment, the pole layer 16 is disposed in the encasing groove 12a of the encasing layer 12 and in the opening 13a of the encasing groove defining layer 13 with the nonmagnetic film 14 and the polishing stopper layer 15 disposed between the pole layer 16 and each of the encasing groove 12a and the opening 13a. The nonmagnetic film 14 has a thickness within a range of 20 to 80 nm inclusive, for example. However, the thickness of the nonmagnetic film 14 is not limited to this range but can be of any other value, depending on the track width. The polishing stopper layer 15 has a thickness within a range of 20 to 80 nm inclusive, for example.

The shield layer 20 has: the first layer 20A disposed adjacent to the gap layer 18; the second layer 20C located on a side of the first layer 20A farther from the gap layer 18; the yoke layer 20B disposed on the portion of the pole layer 16 where the opening of the gap layer 18 is formed; the coupling layer 20D disposed on the yoke layer 20B; and the third layer 20E disposed to couple the second layer 20C to the coupling layer 20D. The second layer 20C is disposed between the medium facing surface 30 and at least part of the coil 23. The coil 23 is wound around the coupling layer 20D. In the example shown in FIG. 5, part of the yoke layer 20B is disposed between the pole layer 16 and part of the coil 23. However, in place of such a yoke layer 20B, there may be provided a coupling layer that has a plane geometry the same as that of the coupling layer 20D and that couples the pole layer 16 to the coupling layer 20D.

The first layer 20A has a first end located in the medium facing surface 30 and a second end opposite to the first end. The second layer 20C also has a first end located in the medium facing surface 30 and a second end opposite to the first end. Throat height TH is the distance between the medium facing surface 30 and a point at which the space between the pole layer 16 and the shield layer 20 starts to increase when seen from the medium facing surface 30. In the embodiment, the throat height TH is the distance between the medium facing surface 30 and an end of the first layer 20A farther from the medium facing surface 30. The throat height TH is within a range of 0.05 to 0.3 μm inclusive, for example.

Figure 1:
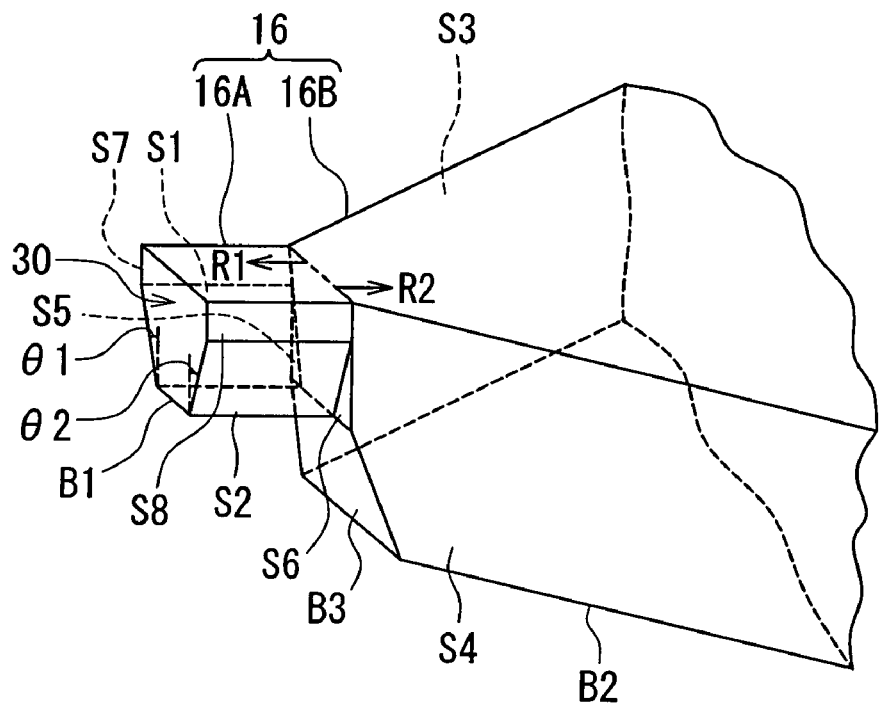
FIG. 1 is a perspective view illustrating a portion of a pole layer of a magnetic head of a first embodiment of the invention.
Figure 2:
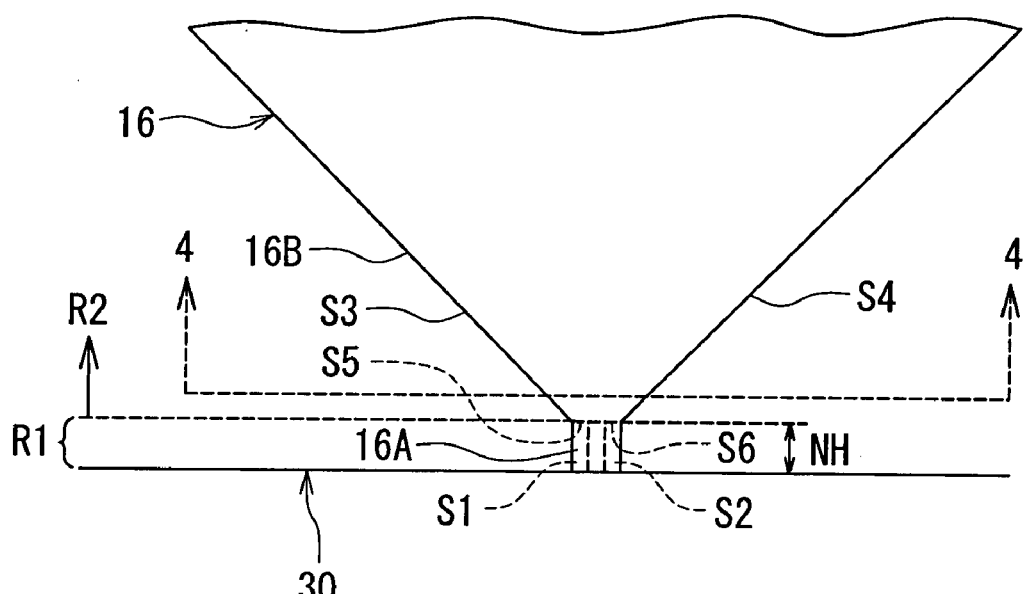
FIG. 2 is a top view illustrating a portion of the pole layer of the magnetic head of the first embodiment of the invention.
Figure 3:
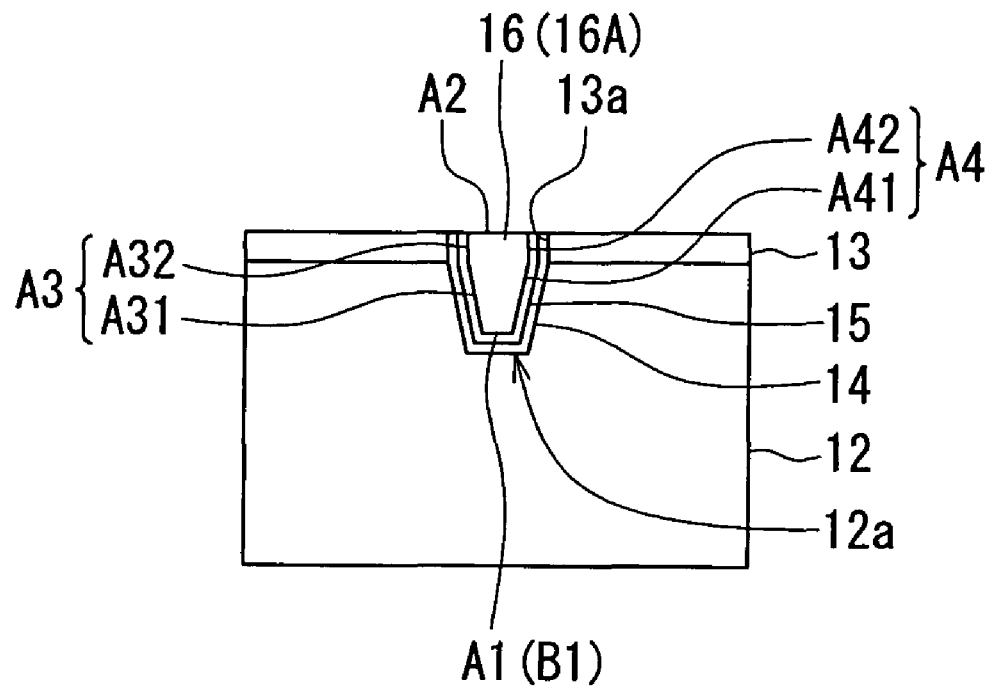
FIG. 3 is a front view illustrating a portion of the medium facing surface of the magnetic head of the first embodiment of the invention.
Figure 4:
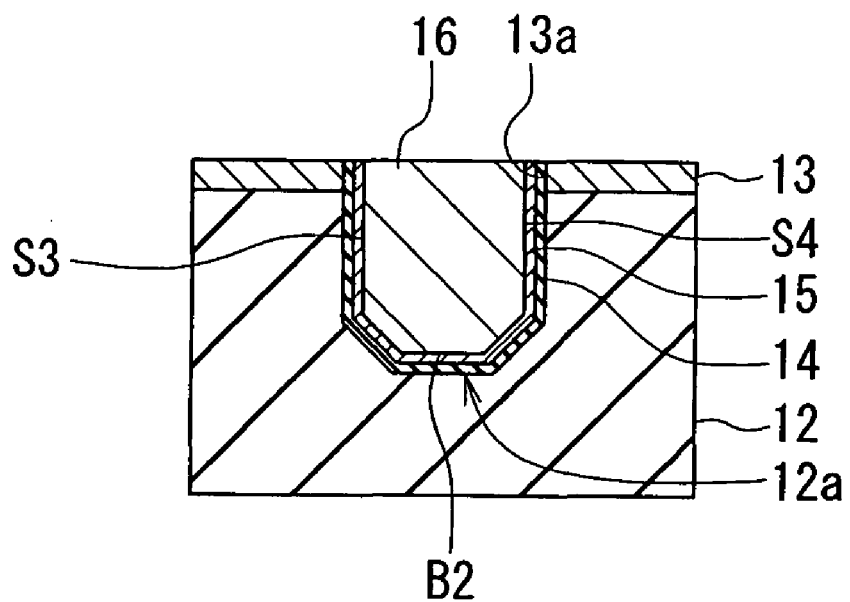
FIG. 4 is a cross-sectional view illustrating a portion of a cross section of the magnetic head of the first embodiment of the invention, the cross section being parallel to the medium facing surface.

Reference is now made to FIG. 1 to FIG. 4 to describe the shape of the pole layer 16 in detail. FIG. 1 is a perspective view illustrating a portion of the pole layer 16 in a neighborhood of the medium facing surface 30. FIG. 2 is a top view illustrating a portion of the pole layer 16 in a neighborhood of the medium facing surface 30. FIG. 3 is a front view illustrating a portion of the medium facing surface 30 of the magnetic head of the embodiment. FIG. 4 is a cross-sectional view illustrating a portion of a cross section of the magnetic head of the embodiment, the cross section being parallel to the medium facing surface 30. FIG. 4 illustrates the cross section taken along line 4-4 of FIG. 2.

As shown in FIG. 1 and FIG. 2, the pole layer 16 includes a track width defining portion 16A and a wide portion 16B. The track width defining portion 16A has an end face located in the medium facing surface 30 and an end opposite to the end face. The wide portion 16B is connected to the end of the track width defining portion 16A and has a width greater than the width of the track width defining portion 16A. The width of the track width defining portion 16A does not change substantially in accordance with the distance from the medium facing surface 30. For example, the wide portion 16B is equal in width to the track width defining portion 16A at the boundary with the track width defining portion 16A, and gradually increases in width as the distance from the medium facing surface 30 increases and then maintains a specific width to the end of the wide portion 16B. In the embodiment it is defined that the track width defining portion 16A is a portion of the pole layer 16 from the end face located in the medium facing surface 30 to the point at which the width of the pole layer 16 starts to increase. Here, the length of the track width defining portion 16A taken in the direction orthogonal to the medium facing surface 30 is called a neck height NH. The neck height NH falls within a range of 60 to 200 nm inclusive, for example.

Figure 14:
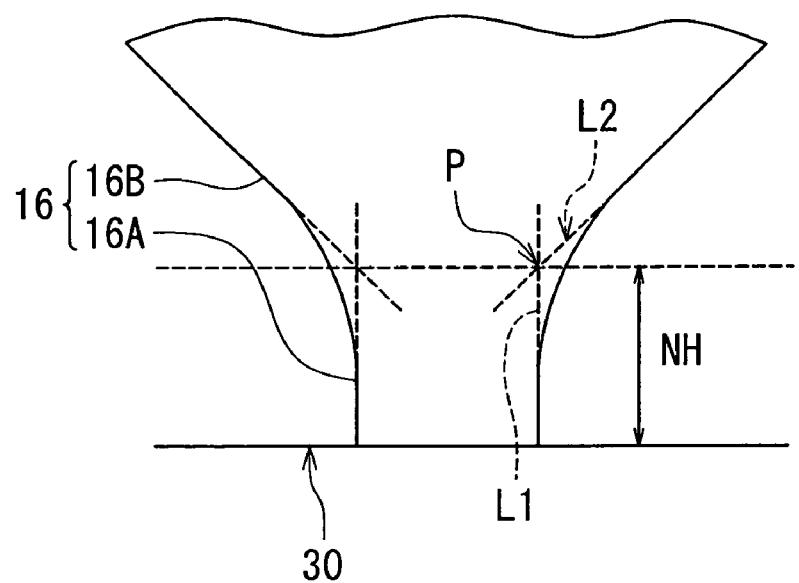
FIG. 14 is a top view illustrating a portion of the pole layer near the boundary between the track width defining portion and the wide portion.

It is difficult to precisely form a portion of the side surface of the pole layer 16 near the boundary between the track width defining portion 16A and the wide portion 16B. It is therefore likely that a portion of the pole layer 16 near the boundary between the track width defining portion 16A and the wide portion 16B has such a shape that the width gradually increases as the distance from the medium facing surface 30 increases. FIG. 14 illustrates such an example. FIG. 14 is a top view of the portion of the pole layer 16 near the boundary between the track width defining portion 16A and the wide portion 16B. In this case, the position of the boundary between the track width defining portion 16A and the wide portion 16B and the neck height NH are defined as will now be described. In the top surface of the pole layer 16, the intersection point of imaginary straight lines L1 and L2 is defined as P. The imaginary straight line L1 passes through the intersection point of the medium facing surface 30 and the side portion of the track width defining portion 16A, and extends in the direction orthogonal to the medium facing surface 30. The imaginary straight line L2 extends from a straight-line portion of the side portion of the wide portion 16B contiguous to the side portion of the portion 16A in the direction in which the straight-line portion extends. The position of an imaginary plane that passes through this point P and is parallel to the medium facing surface 30 is defined as the position of the boundary between the track width defining portion 16A and the wide portion 16B. The distance between the medium facing surface 30 and the point P is defined as the neck height NH. The neck height NH as thus defined is nearly equal to the neck height NH as designed.

As shown in FIG. 3, the end face of the track width defining portion 16A located in the medium facing surface 30 has: a first side A1 closest to the substrate 1; a second side A2 opposite to the first side A1; a third side A3 connecting an end of the first side A1 to an end of the second side A2; and a fourth side A4 connecting the other end of the first side A1 to the other end of the second side A2. The second side A2 defines the track width. The width of the end face of the track width defining portion 16A located in the medium facing surface 30 decreases as the distance from the first side A1 decreases. The third side A3 includes: a first portion A31 opposed to the wall surface of the encasing groove 12a; and a second portion A32 opposed to the wall surface of the opening 13a. Similarly, the fourth side A4 includes: a first portion A41 opposed to the wall surface of the encasing groove 12a; and a second portion A42 opposed to the wall surface of the opening 13a. The first portions A31 and A41 are tilted with respect to the direction orthogonal to the top surface of the substrate 1. The angle formed by each of the first portion A31 and A41 with respect to the direction orthogonal to the top surface of the substrate 1 falls within a range of 5 to 15 degrees inclusive, for example, and preferably within a range of 8 to 12 degrees inclusive. The second portions A32 and A42 are substantially orthogonal to the top surface of the substrate 1.

The length of the second side A2, that is, the track width, falls within a range of 0.05 to 0.20 µm inclusive, for example. The thickness of the pole layer 16 taken in the medium facing surface 30 falls within a range of 0.15 to 0.3 µm inclusive, for example.

As shown in FIG. 1, the pole layer 16 has: a first side surface S1 and a second side surface S2 located opposite to each other in a first region R1 that extends from the medium facing surface 30 to the position at a distance within a range of 10 to 300 nm inclusive from the medium facing surface 30; a third side surface S3 and a fourth side surface S4 located in a second region R2 other than the first region R1; a fifth side surface S5 located at the boundary between the first region R1 and the second region R2 and connecting the first side surface S1 and the third side surface S3 to each other; a sixth side surface S6 located at the boundary between the first region R1 and the second region R2 and connecting the second side surface S2 and the fourth side surface S4 to each other; and a seventh side surface S7 and an eighth side surface S8 located opposite to each other in the first region R1.

The first and second side surfaces S1 and S2 are opposed to the wall surface of the encasing groove 12a while the seventh and eighth side surfaces S7 and S8 are opposed to the wall surface of the opening 13a. The seventh side surface S7 is contiguous to the first side surface S1 while the eighth side surface S8 is contiguous to the second side surface S2. An end of the first side surface S1 located in the medium facing surface 30 forms the first portion A31 of the third side A3. An end of the second side surface S2 located in the medium facing surface 30 forms the first portion A41 of the fourth side A4. An end of the seventh side surface S7 located in the medium facing surface 30 forms the second portion A32 of the third side A3. An end of the eighth side surface S8 located in the medium facing surface 30 forms the second portion A42 of the fourth side A4.

The distance between the first side surface S1 and the second side surface S2 taken in the direction of track width decreases with decreasing distance from the top surface of the substrate 1. An angle $\theta 1$ formed by the first side surface S1 with respect to the direction orthogonal to the top surface of the substrate 1 and an angle $\theta 2$ formed by the second side surface S2 with respect to the direction orthogonal to the top surface of the substrate 1 are each equal to the angle formed by each of the first portions A31 and A41 with respect to the direction orthogonal to the top surface of the substrate 1, and fall within a range of 5 to 15 degrees inclusive, for example, and preferably within a range of 8 to 12 degrees. The seventh and eighth side surfaces S7 and S8 are substantially orthogonal to the top surface of the substrate 1.

The first side surface S1 has an area greater than that of the seventh side surface S7 while the second side surface S2 has an area greater than that of the eighth side surface S8. In the first region R1, the first and second side surfaces S1 and S2 are principal side surfaces of the pole layer 16. In the first region R1, it is not necessarily required to provide the seventh and eighth side surfaces S7 and S8, but the first and second side surfaces S1 and S2 may be only provided.

At the boundary between the first region R1 and the second region R2, the distance between the third side surface S3 and the fourth side surface S4 taken in the direction of track width at the position closest to the top surface of the substrate 1 is greater than the distance between the first side surface S1 and the second side surface S2 taken in the direction of track width at the position closest to the top surface of the substrate 1. The width of each of the fifth side surface S5 and the sixth side surface S6 increases with decreasing distance from the top surface of the substrate 1.

The distance between the third side surface S3 and the fourth side surface S4 taken in the direction of track width may be uniform regardless of the distance from the top surface of the substrate 1, or may decrease or increase with decreasing distance from the top surface of the substrate 1.

In the case in which the distance between the third side surface S3 and the fourth side surface S4 taken in the direction of track width is uniform regardless of the distance from the top surface of the substrate 1, the angle formed by the third side surface S3 with respect to the direction orthogonal to the top surface of the substrate 1 and the angle formed by the fourth side surface S4 with respect to the direction orthogonal to the top surface of the substrate 1 are each zero degree.

In the embodiment, in the case in which the distance between the third side surface S3 and the fourth side surface S4 taken in the direction of track width decreases with decreasing distance from the top surface of the substrate 1, the angle formed by the third side surface S3 with respect to the direction orthogonal to the top surface of the substrate 1 is smaller than the angle $\theta 1$ formed by the first side surface S1 with respect to the direction orthogonal to the top surface of the substrate 1, and the angle formed by the fourth side surface S4 with respect to the direction orthogonal to the top surface of the substrate 1 is smaller than the angle $\theta 2$ formed by the second side surface S2 with respect to the direction orthogonal to the top surface of the substrate 1. In this case, it is preferred that each of the angle formed by the third side surface S3 with respect to the direction orthogonal to the top surface of the substrate 1 and the angle formed by the fourth side surface S4 with respect to the direction orthogonal to the top surface of the substrate 1 be as close as possible to zero degree.

FIG. 1 and FIG. 2 illustrate an example in which the distance from the medium facing surface 30 to the boundary between the first region R1 and the second region R2 is equal to the distance from the medium facing surface 30 to the boundary between the track width defining portion 16A and the wide portion 16B, that is, the neck height NH. However, the distance from the medium facing surface 30 to the boundary between the first region R1 and the second region R2 may be either smaller or greater than the distance from the medium facing surface 30 to the boundary between the track width defining portion 16A and the wide portion 16B, that is, the neck height NH. Such examples will be illustrated later as first and second modification examples.

The portion of the pole layer 16 located in the first region R1 has a first bottom surface B1 that is a surface closest to the top surface of the substrate 1. The portion of the pole layer 16 located in the second region R2 has a second bottom surface B2 that is a surface closest to the top surface of the substrate 1. The second bottom surface B2 is located closer to the top surface of the substrate 1 than the first bottom surface B1. Furthermore, the pole layer has a surface B3 that couples the bottom surfaces B1 and B2 to each other. In the embodiment the pole layer 16 has a flattened top surface.

Reference is now made to FIG. 7A to FIG. 13B to describe a method of manufacturing the magnetic head of the embodiment. In FIG. 7A to FIG. 13B, 'ABS' indicates an imaginary plane located at the target position of the medium facing surface 30. The portions located below the encasing layer 12 are omitted in FIG. 7A to FIG. 13B.

In the method of manufacturing the magnetic head of the embodiment, as shown in FIG. 3, the insulating layer 2, the bottom shield layer 3 and the bottom shield gap film 4 are first formed in this order on the substrate 1. Next, the MR element 5 and leads (not shown) connected to the MR element 5 are formed on the bottom shield gap film 4. Next, the top shield gap film 6 is formed to cover the MR element 5 and the leads. Next, the top shield layer 7, the nonmagnetic layer 81, the second top shield layer 82, and the insulating layer 83 are formed in this order on the top shield gap film 6. Next, the coil 9 and the insulating layers 10 and 11 are formed on the insulating layer 83. Next, the top surfaces of the coil 9 and the insulating layers 10 and 11 are flattened by chemical mechanical polishing (CMP), for example.

Figure 7A:
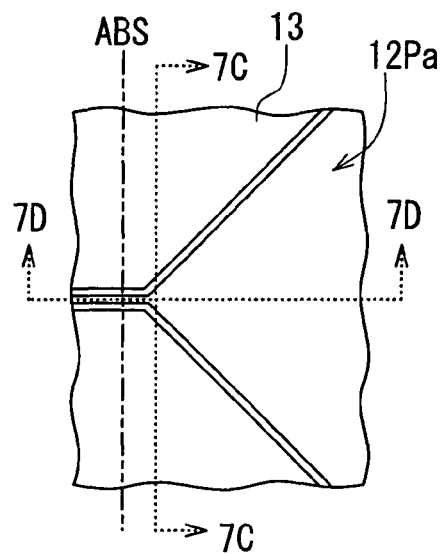
FIG. 7A to FIG. 7D are views for illustrating a step of a method of manufacturing the magnetic head of the first embodiment of the invention.
Figure 7B:
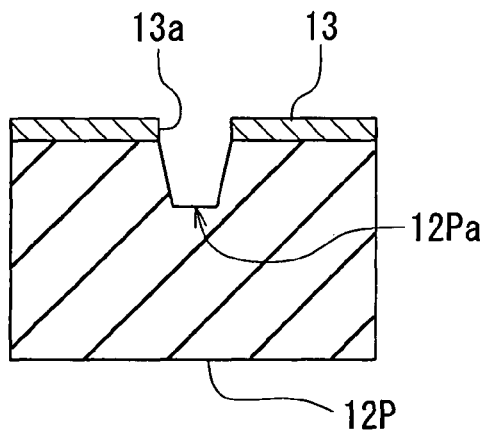
Figure 7C:
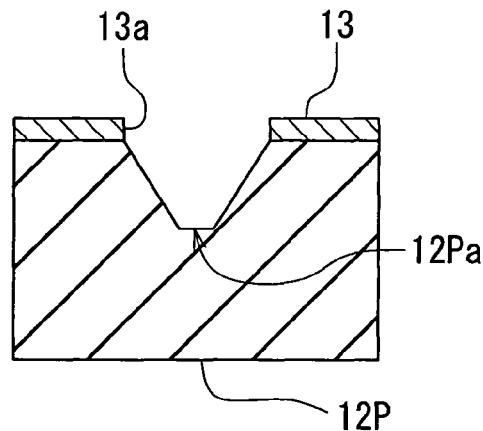
Figure 7D:
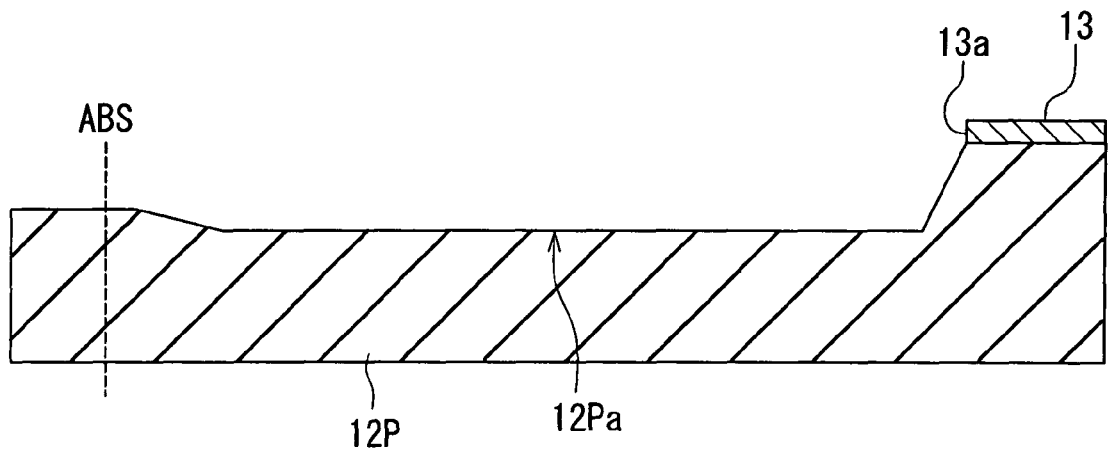

FIG. 7A to FIG. 7D illustrate the following step. FIG. 7A is a top view of a layered structure obtained in the manufacturing process of the magnetic head. FIG. 7B is a cross-sectional view illustrating a cross section of the layered structure of FIG. 7A taken in the plane ABS. FIG. 7C is a cross-sectional view illustrating a cross section of the layered structure of FIG. 7A taken along line 7C-7C. FIG. 7D is a cross-sectional view illustrating a cross section of the layered structure of FIG. 7A taken along line 7D-7D.

In the step, first, on the flattened top surfaces of the coil 9 and the insulating layers 10 and 11 there is formed a nonmagnetic layer 12P that is to be the encasing layer 12 later by undergoing formation of the encasing groove 12a therein. Next, the encasing groove defining layer 13 is formed by sputtering, for example, on the nonmagnetic layer 12P. The encasing groove defining layer 13 has a thickness within a range of 20 to 100 nm inclusive, for example.

Next, a photoresist mask (not shown) for forming the opening 13a in the encasing groove defining layer 13 is formed on the encasing groove defining layer 13. The photoresist mask has an opening having a shape corresponding to the opening 13a and the encasing groove 12a. The photoresist mask is formed by patterning a photoresist layer by photolithography. Next, the encasing groove defining layer 13 is selectively etched using the photoresist mask. The opening 13a that penetrates is thereby formed in the encasing groove defining layer 13. The opening 13a has a shape corresponding to the plane geometry of the pole layer 16 to be formed later.

Next, a portion of the nonmagnetic layer 12P exposed from the opening 13a of the encasing groove defining layer 13 is selectively etched, using the photoresist mask and the encasing groove defining layer 13 as etching masks, to thereby form in the nonmagnetic layer 12P an initial groove 12Pa that is to be the encasing groove 12a later by undergoing etching. This step of forming the initial groove 12Pa is called a first etching step. Next, the photoresist mask is removed. The edge of the opening 13a of the encasing groove defining layer 13 is located directly above the edge of the initial groove 12Pa in the top surface of the nonmagnetic layer 12P.

The first etching step is performed by reactive ion etching or ion beam etching, for example. The first etching step is performed such that a portion of the wall surface of the initial groove 12Pa that is to be opposed to the first and second side surfaces S1 and S2 of the pole layer 16 forms an angle within a range of 5 to 15 degrees inclusive, for example, or preferably within a range of 8 to 12 degrees inclusive, with respect to the direction orthogonal to the top surface of the substrate 1. After the first etching step, the angle formed by a portion of the wall surface of the initial groove 12Pa located in the second region R2 with respect to the direction orthogonal to the top surface of the substrate 1 is about once to twice the angle formed by the portion of the wall surface of the initial groove 12Pa that is to be opposed to the first and second side surfaces S1 and S2 of the pole layer 16 with respect to the direction orthogonal to the top surface of the substrate 1.

Figure 8A:
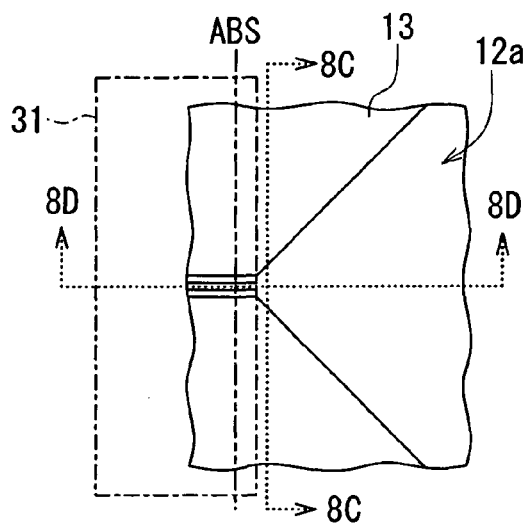
FIG. 8A to FIG. 8D are views for illustrating a step that follows the step of FIG. 7A to FIG. 7D.
Figure 8B:
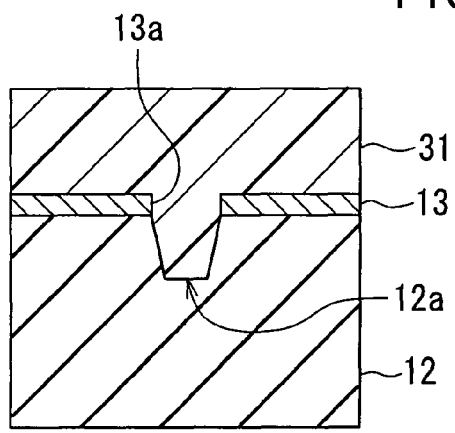
Figure 8C:
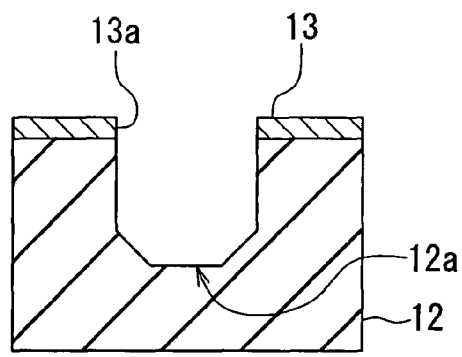
Figure 8D:
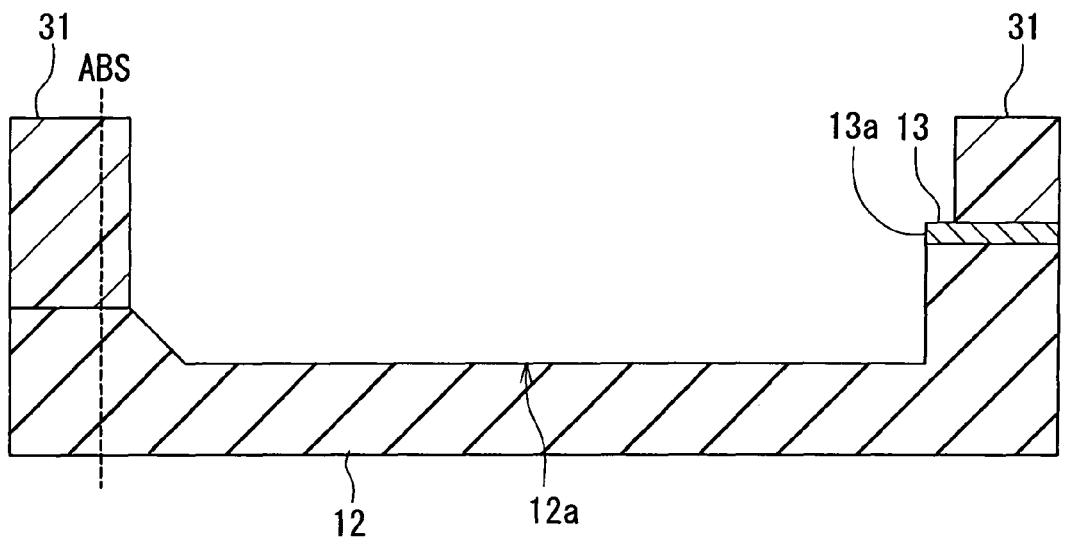

FIG. 8A to FIG. 8D illustrate the following step. FIG. 8A is a top view of a layered structure obtained in the manufacturing process of the magnetic head. FIG. 8B is a cross-sectional view illustrating a cross section of the layered structure of FIG. 8A taken in the plane ABS. FIG. 8C is a cross-sectional view illustrating a cross section of the layered structure of FIG. 8A taken along line 8C-8C. FIG. 8D is a cross-sectional view illustrating a cross section of the layered structure of FIG. 8A taken along line 8D-8D.

In the step, first, a mask 31 is formed on portions of the encasing groove defining layer 13 and the initial groove 12Pa located in the first region R1. The mask 31 is formed by patterning a photoresist layer by photolithography, for example. Next, a portion of the initial groove 12Pa that is not covered with the mask 31, that is, a portion of the initial groove 12Pa located in the second region R2, is only etched to complete the encasing groove 12a. This step is called a second etching step. The second etching step is performed by reactive ion etching or ion beam etching, for example. The second etching step is not limited to anisotropic etching such as reactive ion etching or ion beam etching, but may be performed by isotropic etching. Isotropic etching in this case may be wet etching or dry etching. In the case of wet etching, an alkaline etching solution is used. Next, the mask 31 is removed.

In the second etching step, for example, the above-described etching is performed so that the angle formed by the portion of the wall surface of the encasing groove 12a located in the second region R2 with respect to the direction orthogonal to the top surface of the substrate 1 is made smaller than the angle formed by the portion of the wall surface of the encasing groove 12a located in the first region R1 with respect to the direction orthogonal to the top surface of the substrate 1. Alternatively, in the second etching step, the above-described etching is performed so that the width of the portion of the encasing groove 12a located in the second region R2 increases with decreasing distance from the top surface of the substrate 1.

In this step, the encasing groove 12a is completed by etching only the portion of the initial groove 12Pa located in the second region R2 using the mask 31 and the encasing groove defining layer 13 as etching masks. As a result, the position of the portion of the wall surface of the encasing groove 12a located in the second region R2 is defined with precision by the edge of the opening 13a of the encasing groove defining layer 13.

Through the second etching step, the portion of the encasing groove 12a located in the second region R2 is made deeper than the portion of the encasing groove 12a located in the first region R1.

In the first etching step, portions of the encasing groove 12a that are to be opposed to the first side surface S1, the second side surface S2 and the first bottom surface B1 of the pole layer 16 are formed. In the second etching step, portions of the encasing groove 12a that are to be opposed to the third to sixth side surfaces S3, S4, S5 and S6, the bottom surface B2 and the surface B3 of the pole layer 16 are formed.

Figure 9A:
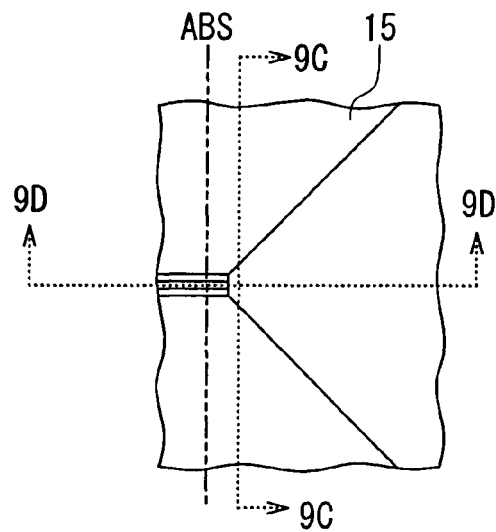
FIG. 9A to FIG. 9D are views for illustrating a step that follows the step of FIG. 8A to FIG. 8D.
Figure 9B:
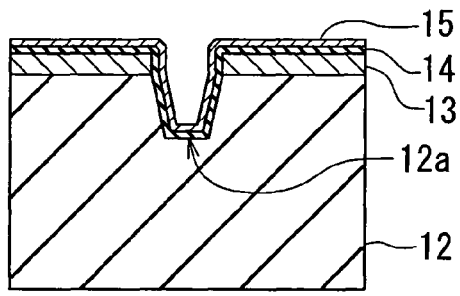
Figure 9C:
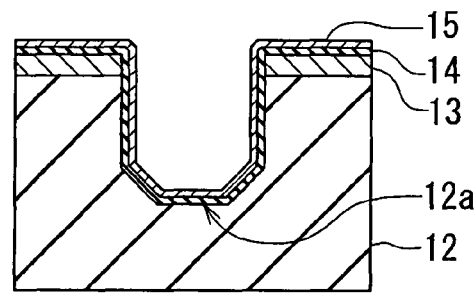
Figure 9D:
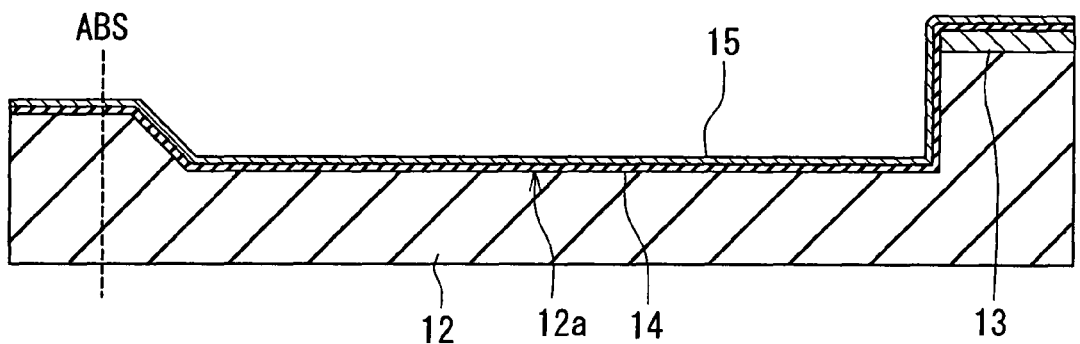

FIG. 9A to FIG. 9D illustrate the following step. FIG. 9A is a top view of a layered structure obtained in the manufacturing process of the magnetic head. FIG. 9B is a cross-sectional view illustrating a cross section of the layered structure of FIG. 9A taken in the plane ABS. FIG. 9C is a cross-sectional view illustrating a cross section of the layered structure of FIG. 9A taken along line 9C-9C. FIG. 9D is a cross-sectional view illustrating a cross section of the layered structure of FIG. 9A taken along line 9D-9D.

In the step, first, the nonmagnetic film 14 is formed on the entire top surface of the layered structure. The nonmagnetic film 14 is formed in the encasing groove 12a, too. The nonmagnetic film 14 is formed by sputtering or chemical vapor deposition (CVD), for example. It is possible to control the thickness of the nonmagnetic film 14 with precision. In the case of forming the nonmagnetic film 14 by CVD, it is preferred to employ a method called 'atomic layer CVD' (ALCVD) in which formation of a single atomic layer is repeated. In this case, it is possible to control the thickness of the nonmagnetic film 14 with higher precision. When ALCVD is employed to form the nonmagnetic film 14, it is preferred to use alumina, in particular, as the material of the nonmagnetic film 14. In the case of using a semiconductor material to form the nonmagnetic film 14, it is preferred to form the nonmagnetic film 14 by ALCVD at a low temperature (around 200° C.) or by low-pressure CVD at a low temperature. The semiconductor material as the material of the nonmagnetic film 14 is preferably undoped polycrystalline silicon or amorphous silicon.

Next, the polishing stopper layer 15 is formed on the entire top surface of the layered structure by sputtering or ALCVD, for example. The polishing stopper layer 15 is formed in the encasing groove 12a, too. The polishing stopper layer 15 indicates the level at which polishing of the polishing step to be performed later is stopped.

Figure 10A:
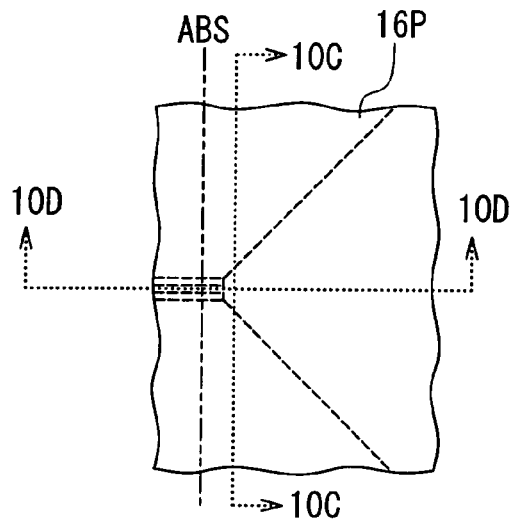
FIG. 10A to FIG. 10D are views for illustrating a step that follows the step of FIG. 9A to FIG. 9D.
Figure 10B:
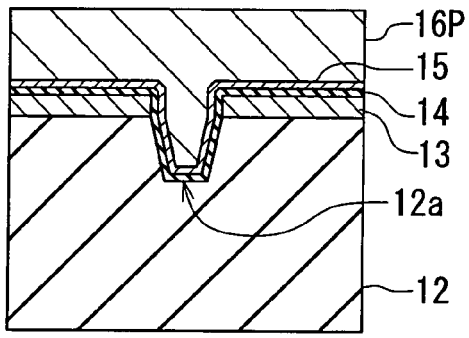
Figure 10C:
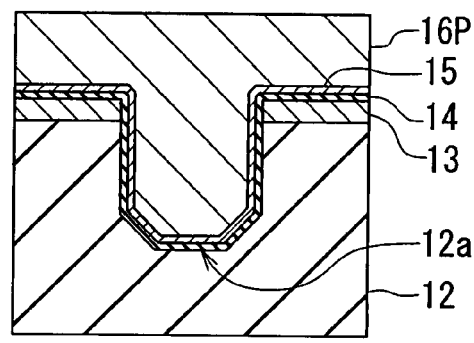
Figure 10D:
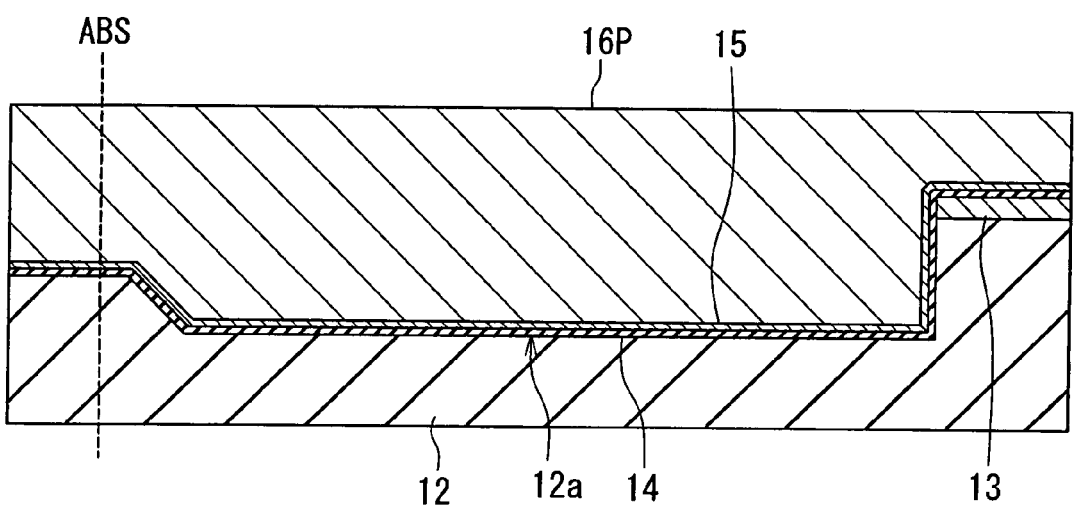

FIG. 10A to FIG. 10D illustrate the following step. FIG. 10A is a top view of a layered structure obtained in the manufacturing process of the magnetic head. FIG. 10B is a cross-sectional view illustrating a cross section of the layered structure of FIG. 10A taken in the plane ABS. FIG. 10C is a cross-sectional view illustrating a cross section of the layered structure of FIG. 10A taken along line 10C-10C. FIG. 10D is a cross-sectional view illustrating a cross section of the layered structure of FIG. 10A taken along line 10D-10D.

In the step, a magnetic layer 16P that is to be the pole layer 16 later is formed. The magnetic layer 16P is formed such that the top surface thereof is located higher than the top surfaces of the encasing groove defining layer 13, the nonmagnetic film 14 and the polishing stopper layer 15. The magnetic layer 16P may be formed by frame plating or by making an unpatterned plating layer and then patterning the plating layer through etching.

Figure 11A:
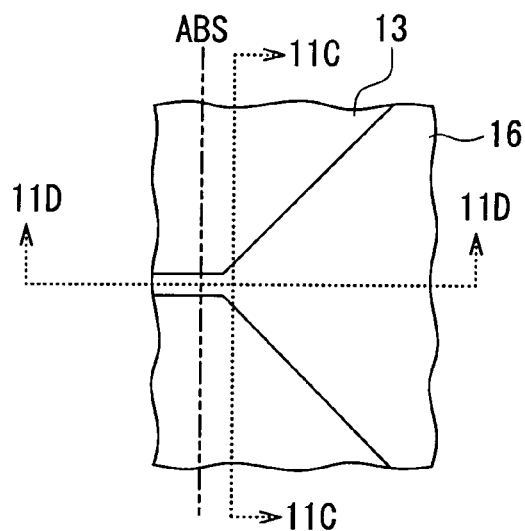
FIG. 11A to FIG. 11D are views for illustrating a step that follows the step of FIG. 10A to FIG. 10D.
Figure 11B:
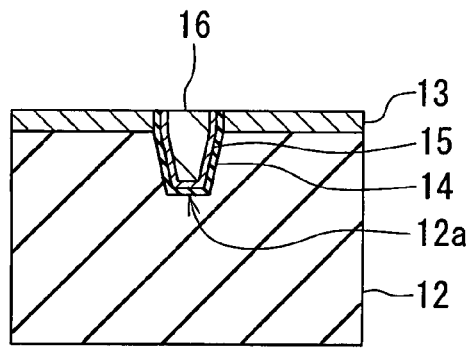
Figure 11C:
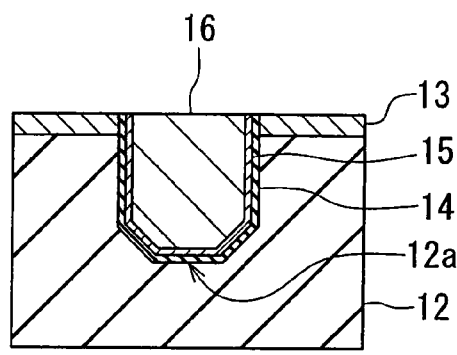
Figure 11D:
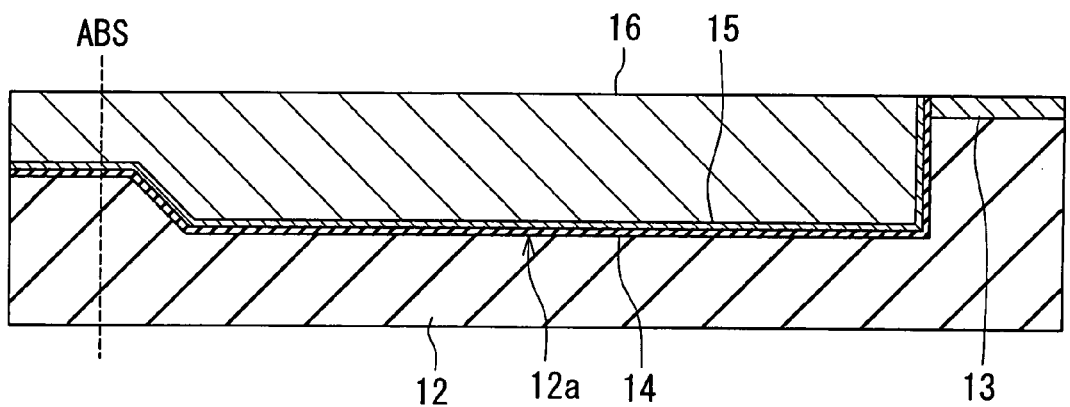

FIG. 11A to FIG. 11D illustrate the following step. FIG. 11A is a top view of a layered structure obtained in the manufacturing process of the magnetic head. FIG. 11B is a cross-sectional view illustrating a cross section of the layered structure of FIG. 11A taken in the plane ABS. FIG. 11C is a cross-sectional view illustrating a cross section of the layered structure of FIG. 11A taken along line 11C-11C. FIG. 11D is a cross-sectional view illustrating a cross section of the layered structure of FIG. 11A taken along line 11D-11D.

In the step, first, a coating layer not shown made of alumina, for example, is formed on the entire top surface of the layered structure. Next, the coating layer and the magnetic layer 16P are polished by CMP, for example, so that the polishing stopper layer 15 is exposed, and the top surfaces of the polishing stopper layer 15 and the magnetic layer 16P are thereby flattened. In the case in which the coating layer and the magnetic layer 16P are polished by CMP, such a slurry is used that polishing is stopped when the polishing stopper layer 15 is exposed, such as an alumina-base slurry.

Next, a portion of the polishing stopper layer 15 exposed at the top surface of the layered structure is selectively etched by reactive ion etching or ion beam etching, for example. Next, the nonmagnetic film 14, the polishing stopper layer 15 and the magnetic layer 16P are polished by CMP, for example, so that the encasing groove defining layer 13 is exposed, and the top surfaces of the encasing groove defining layer 13, the nonmagnetic film 14, the polishing stopper layer 15 and the magnetic layer 16P are thereby flattened. As a result, the remainder of the magnetic layer 16P is formed into the pole layer 16. In the case in which the nonmagnetic film 14, the polishing stopper layer 15 and the magnetic layer 16P are polished by CMP, such a slurry is used that polishing is stopped when the encasing groove defining layer 13 is exposed, such as an alumina-base slurry. It is possible to control the thickness of the pole layer 16 with accuracy by stopping the polishing when the encasing groove defining layer 13 is exposed as thus described.

Figure 12A:
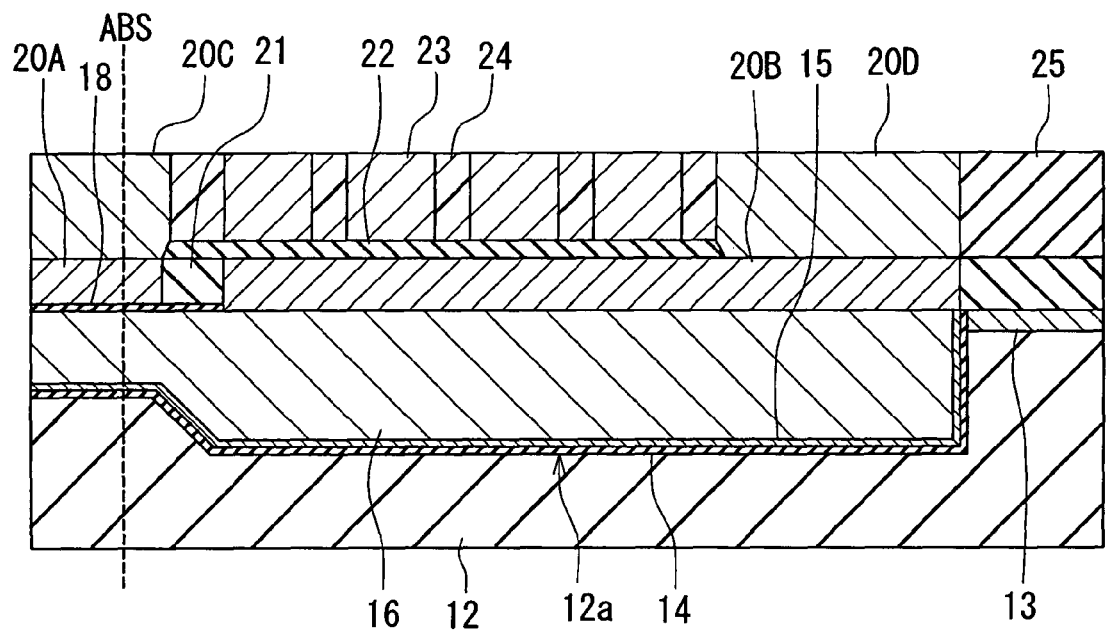
FIG. 12A and FIG. 12B are views for illustrating a step that follows the step of FIG. 1A to FIG. 1D.
Figure 12B:
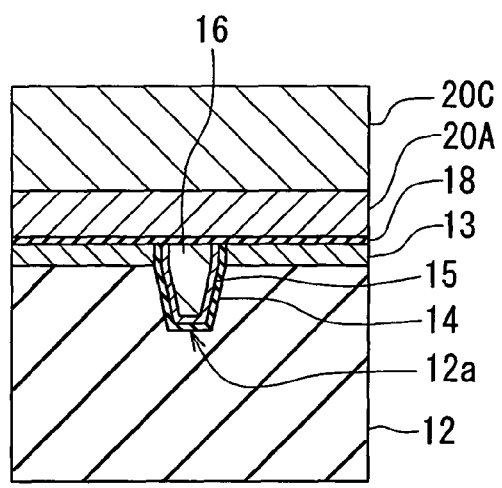

FIG. 12A and FIG. 12B illustrate the following step. FIG. 12A is a cross-sectional view of a layered structure obtained in the manufacturing process of the magnetic head. FIG. 12B is a cross-sectional view illustrating a cross section of the layered structure of FIG. 12A taken in the plane ABS. In the step, first, the gap layer 18 is formed on the entire top surface of the layered structure. The gap layer 18 is formed by sputtering or CVD, for example. In the case of forming the gap layer 18 by CVD, it is preferred to employ ALCVD, in particular. In the case of employing ALCVD to form the gap layer 18, it is preferred to choose alumina as the material of the gap layer 18.

Next, a portion of the gap layer 18 away from the medium facing surface 30 is selectively etched to form an opening in the gap layer 18. Next, the first layer 20A is formed on the gap layer 18, and the yoke layer 20B is formed on a portion of the pole layer 16 where the opening of the gap layer 18 is formed. The first layer 20A and the yoke layer 20B may be formed by frame plating or by making a magnetic layer through sputtering and then selectively etching the magnetic layer. Next, the nonmagnetic layer 21 is formed on the entire top surface of the layered structure. Next, the nonmagnetic layer 21 is polished by CMP, for example, so that the first layer 20A and the yoke layer 20B are exposed, and the top surfaces of the first layer 20A, the yoke layer 20B and the nonmagnetic layer 21 are flattened.

Next, the insulating layer 22 is formed on regions of the top surfaces of the yoke layer 20B and the nonmagnetic layer 21 in which the coil 23 is to be disposed. Next, the coil 23 is formed by frame plating, for example, such that at least part of the coil 23 is disposed on the insulating layer 22. Next, the second layer 20C and the coupling layer 20D are formed by frame plating, for example. Alternatively, the coil 23 may be formed after the second layer 20C and the coupling layer 20D are formed.

Next, the insulating layer 24 made of photoresist, for example, is selectively formed around the coil 23 and in the space between the respective adjacent turns of the coil 23. Next, the insulating layer 25 is formed on the entire top surface of the layered structure. Next, the insulating layer 25 is polished by CMP, for example, so that the second layer 20C, the coupling layer 20D and the coil 23 are exposed, and the top surfaces of the second layer 20C, the coupling layer 20D, the coil 23, and the insulating layers 24 and 25 are thereby flattened.

Figure 13A:
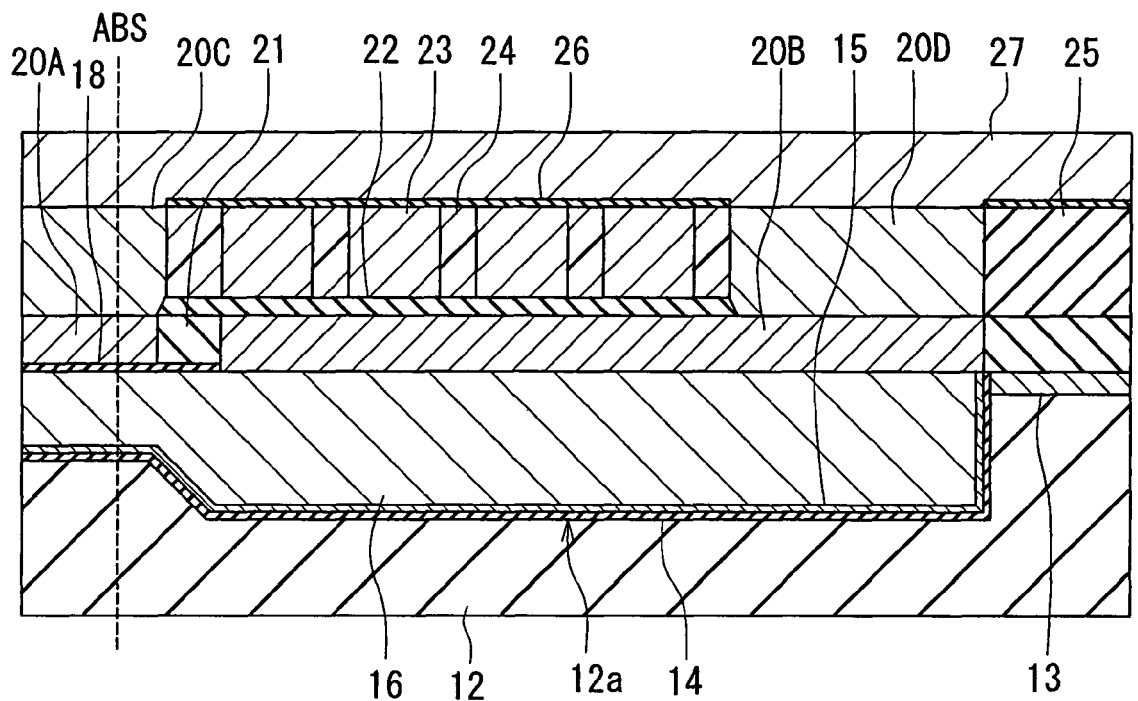
FIG. 13A and FIG. 13B are views for illustrating a step that follows the step of FIG. 12A and FIG. 12B.
Figure 13B:
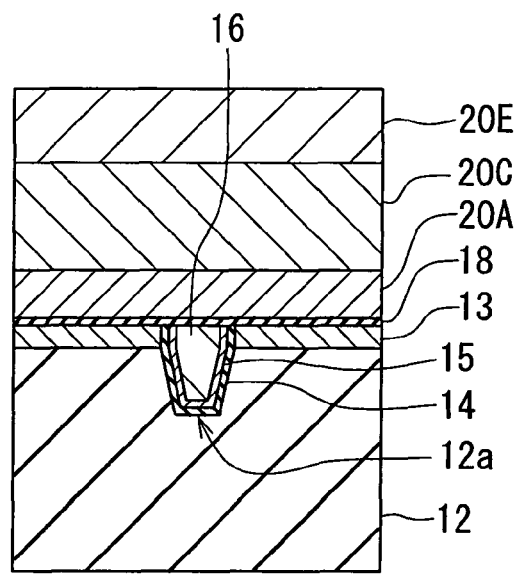

FIG. 13A and FIG. 13B illustrate the following step. FIG. 13A is a cross-sectional view of a layered structure obtained in the manufacturing process of the magnetic head. FIG. 13B is a cross-sectional view illustrating a cross section of the layered structure of FIG. 13A taken in the plane ABS. In the step, first, the insulating layer 26 is formed on the coil 23 and the insulating layers 24 and 25. Next, the third layer 20E is formed by frame plating, for example, to complete the shield layer 20.

Next, as shown in FIG. 5, the protection layer 27 is formed to cover the entire top surface of the layered structure. Wiring and terminals are then formed on the protection layer 27, the substrate is cut into sliders, and the steps including polishing of the medium facing surface 30 and fabrication of flying rails are performed. The magnetic head is thus completed.

The operation and effects of the magnetic head of the embodiment will now be described. The magnetic head writes data on a recording medium by using the write head and reads data written on the recording medium by using the read head. In the write head the coil 23 generates a magnetic field that corresponds to the data to be written on the medium. The pole layer 16 and the shield layer 20 form a magnetic path through which a magnetic flux corresponding to the magnetic field generated by the coil 23 passes. The pole layer 16 allows the flux corresponding to the field generated by the coil 23 to pass and generates a write magnetic field used for writing the data on the medium by means of the perpendicular magnetic recording system. The shield layer 20 takes in a disturbance magnetic field applied from outside the magnetic head to the magnetic head. It is thereby possible to prevent erroneous writing on the recording medium caused by the disturbance magnetic field intensively taken in into the pole layer 16. The shield 20 also has a function of returning a magnetic flux that has been generated from the end face of the pole layer 16 (the track width defining portion 16A) located in the medium facing surface 30 and that has magnetized the recording medium.

According to the embodiment, in the medium facing surface 30, the end face of the shield layer 20 is located forward of the end face of the pole layer 16 along the direction T of travel of the recording medium (that is, located closer to the air outflow end of the slider) with a specific small distance provided therebetween by the gap layer 18. The position of an end of the bit pattern to be written on the recording medium is determined by the position of the end of the pole layer 16 that is closer to the gap layer 18 and located in the medium facing surface 30. The shield layer 20 takes in a magnetic flux generated from the end face of the pole layer 16 located in the medium facing surface 30 and extending in directions except the direction orthogonal to the surface of the recording medium so as to prevent the flux from reaching the recording medium. It is thereby possible to prevent a direction of magnetization of the bit pattern already written on the medium from being changed due to the effect of the above-mentioned flux. According to the embodiment, an improvement in linear recording density is thus achieved.

According to the embodiment, as shown in FIG. 3, the width of the end face of the track width defining portion 16A located in the medium facing surface 30 decreases as the distance from the first side A1 decreases. It is thereby possible to prevent problems resulting from a skew.

According to the embodiment, the pole layer 16 is disposed in the encasing groove 12a of the encasing layer 12 made of a nonmagnetic material with the nonmagnetic film 14 and the polishing stopper layer 15 disposed between the pole layer 16 and the encasing groove 12a. Consequently, the pole layer 16 is smaller than the encasing groove 12a in width. It is thereby possible to easily form the encasing groove 12a and to easily reduce the width of the pole layer 16 and the width of the top surface of the track width defining portion 16A that defines the track width, in particular. As a result, according to the embodiment, it is possible to easily implement the track width that is smaller than the minimum track width that can be formed by photolithography and to control the track width with accuracy.

In the embodiment the pole layer 16 has: the first and second side surfaces S1 and S2 located opposite to each other in the first region R1 extending from the medium facing surface 30 to the position at a distance within a range of 10 to 300 nm inclusive from the medium facing surface 30; the third and fourth side surfaces S3 and S4 located in the second region R2 other than the first region R1; the fifth side surface S5 located at the boundary between the first region R1 and the second region R2 and connecting the first side surface S1 and the third side surface S3 to each other; and the sixth side surface S6 located at the boundary between the first region R1 and the second region R2 and connecting the second side surface S2 and the fourth side surface S4 to each other.

The distance between the first side surface S1 and the second side surface S2 taken in the direction of track width decreases with decreasing distance from the top surface of the substrate 1. At the boundary between the first region R1 and the second region R2, the distance between the third side surface S3 and the fourth side surface S4 taken in the direction of track width at the position closest to the top surface of the substrate 1 is greater than the distance between the first side surface S1 and the second side surface S2 taken in the direction of track width at the position closest to the top surface of the substrate 1. The width of each of the fifth side surface S5 and the sixth side surface S6 increases with decreasing distance from the top surface of the substrate 1.

As a reference example for comparison with the embodiment, consideration will now be given to a case in which the second etching step is not performed but the first etching step is only performed to form the encasing groove 12a, and the pole layer 16 is formed to be placed in this encasing groove 12a. In this reference example, the distance between the third side surface S3 and the fourth side surface S4 taken in the direction of track width decreases with decreasing distance from the top surface of the substrate 1. In addition, the angles formed by the third and fourth side surfaces S3 and S4 with respect to the direction orthogonal to the top surface of the substrate 1 are equal to or greater than the angles θ1 and θ2, respectively. In the pole layer 16 of this reference example, it is impossible to allow a magnetic flux of great magnitude to pass through a portion near the boundary between the track width defining portion 16A and the wide portion 16B, and as a result, the write characteristics such as an overwrite property will be degraded. In the reference example it is therefore inevitable to reduce the neck height NH so as to suppress degradation of write characteristics. However, a reduction in neck height NH makes it difficult to define the track width with precision.

In contrast, in the pole layer 16 of the embodiment, the cross-sectional area of the pole layer 16 taken in the direction orthogonal to the direction in which magnetic flux flows is greater, compared with the reference example, in the portion near the boundary between the track width defining portion 16A and the wide portion 16B. As a result, in the pole layer 16 of the embodiment, it is possible to allow a magnetic flux of greater magnitude to pass through the portion near the boundary between the track width defining portion 16A and the wide portion 16B, compared with the reference example. According to the embodiment, it is thereby possible to obtain better write characteristics such as an overwrite property, compared with the reference example. Consequently, it is possible to make the neck height NH greater than that of the reference example, which makes it possible to define the track width with higher precision, compared with the reference example.

In the embodiment, the portion of the pole layer 16 located in the first region R1 has the first bottom surface B1 that is the surface closest to the top surface of the substrate 1, the portion of the pole layer 16 located in the second region R2 has the second bottom surface B2 that is the surface closest to the top surface of the substrate 1, and the second bottom surface B2 is located closer to the top surface of the substrate 1 than the first bottom surface B1. As a result, according to the embodiment, it is possible to reduce the thickness of the pole layer 16 taken in the medium facing surface 30 so as to effectively prevent occurrences of problems resulting from a skew while increasing the thickness of the portion of the pole layer 16 located in the second region R2 so as to introduce a magnetic flux of great magnitude to the medium facing surface 30 through the pole layer 16.

Modification Examples

Figure 15:
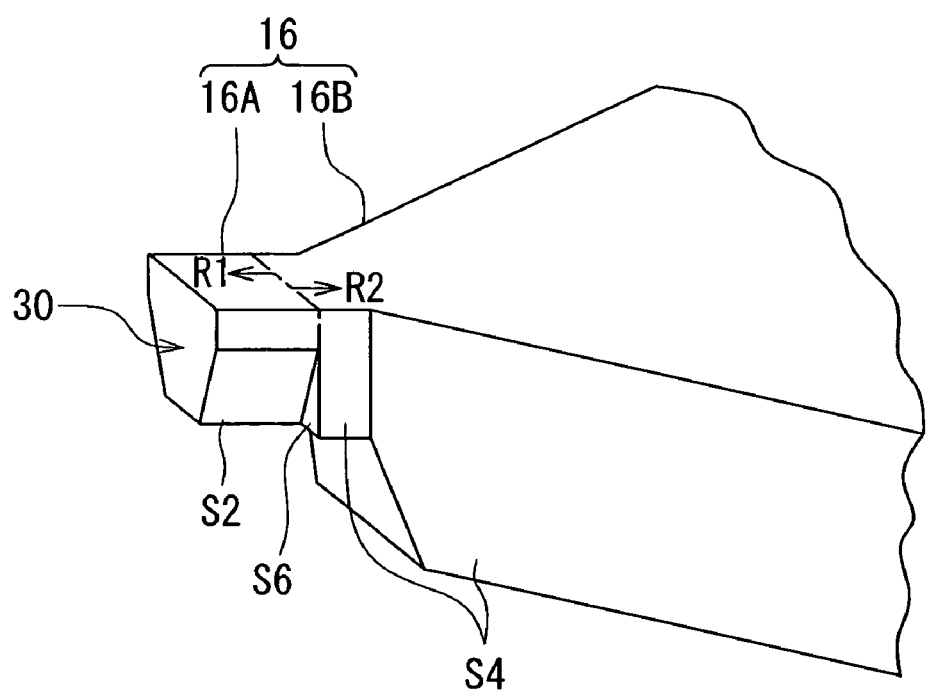
FIG. 15 is a perspective view illustrating a portion of a pole layer of a first modification example of the first embodiment of the invention.
Figure 16:
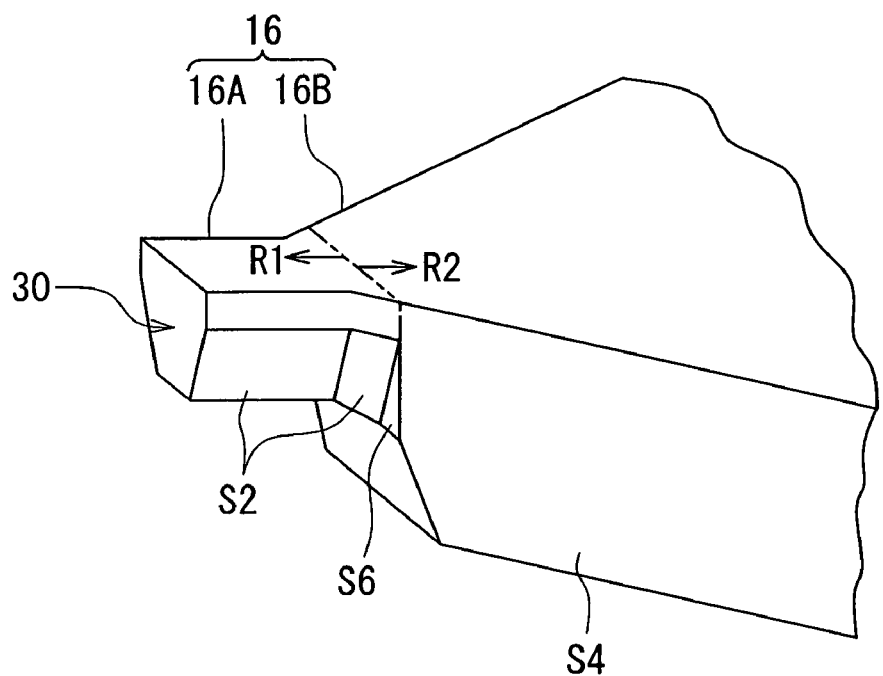
FIG. 16 is a perspective view illustrating a portion of a pole layer of a second modification example of the first embodiment of the invention.
Figure 17:
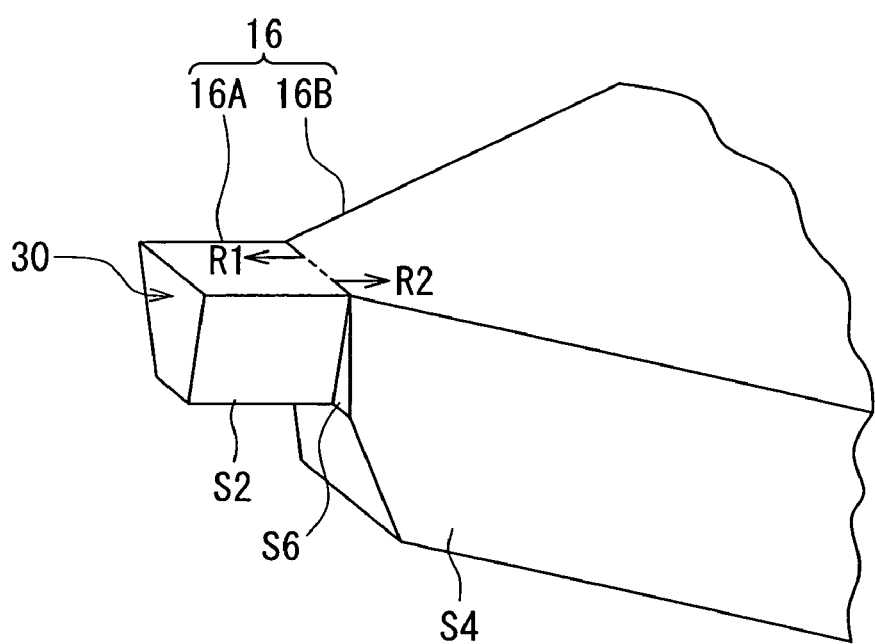
FIG. 17 is a perspective view illustrating a portion of a pole layer of a magnetic head of a third modification example of the first embodiment of the invention.
Figure 18:
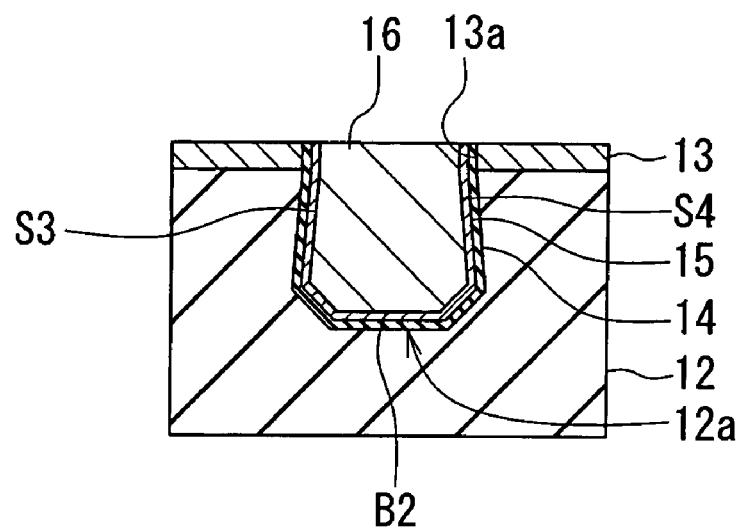
FIG. 18 is a cross-sectional view illustrating a portion of a cross section of a magnetic head of a fourth modification example of the first embodiment of the invention, the cross section being parallel to the medium facing surface.

Reference is now made to FIG. 15 to FIG. 18 to describe first to fourth modification examples of the embodiment. FIG. 15 is a perspective view illustrating a portion of the pole layer 16 of the first modification example. FIG. 16 is a perspective view illustrating a portion of the pole layer 16 of the second modification example. FIG. 17 is a perspective view illustrating a portion of the pole layer 16 of the third modification example. FIG. 18 is a cross-sectional view illustrating a portion of a cross section of a magnetic head of the fourth modification example, the cross section being parallel to the medium facing surface 30. FIG. 18 shows the cross section taken at the same position as FIG. 4.

In the first modification example shown in FIG. 15, the distance from the medium facing surface 30 to the boundary between the first region R1 and the second region R2 is smaller than the distance from the medium facing surface 30 to the boundary between the track width defining portion 16A and the wide portion 16B, that is, the neck height NH.

In the second modification example shown in FIG. 16, the distance from the medium facing surface 30 to the boundary between the first region R1 and the second region R2 is greater than the distance from the medium facing surface 30 to the boundary between the track width defining portion 16A and the wide portion 16B, that is, the neck height NH.

The pole layer 16 of the third modification example shown in FIG. 17 is such one that the seventh and eighth side surfaces S7 and S8 are not provided but the first and second side surfaces S1 and S2 are only provided in the first region R1. The pole layer 16 having such a structure can be formed by, after the step illustrated in FIG. 11A to FIG. 11D, etching the encasing groove defining layer 13, the nonmagnetic film 14, the polishing stopper layer 15 and the magnetic layer 16P by reactive ion etching or ion beam etching, for example, so that the encasing groove defining layer 13 is removed.

In the fourth modification example shown in FIG. 18, the width of the portion of the encasing groove 12a located in the second region R2 increases with decreasing distance from the top surface of the substrate 1. The encasing groove 12a having such a shape can be formed by, in the second etching step, etching only the portion of the initial groove 12Pa located in the second region R2 to produce an undercut (side etching). In the pole layer 16 of the fourth modification example, the distance between the third side surface S3 and the fourth side surface S4 taken in the direction of track width increases with decreasing distance from the top surface of the substrate 1.

The remainder of configuration, function and effects of the first to fourth modification examples are similar to those of the magnetic head shown in FIG. 1 to FIG. 6.

Second Embodiment

Figure 19:
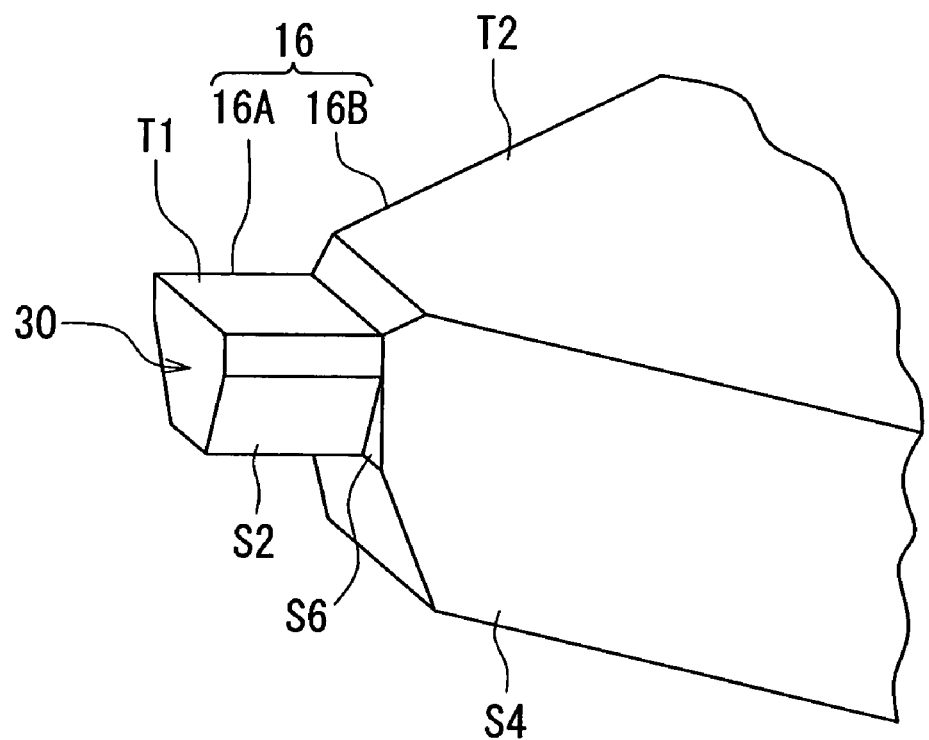
FIG. 19 is a perspective view illustrating a portion of a pole layer of a magnetic head of a second embodiment of the invention.

A magnetic head and a method of manufacturing the same of a second embodiment of the invention will now be described. Reference is now made to FIG. 19 to describe the shape of the pole layer 16 of the second embodiment. In the pole layer 16 of the second embodiment, the track width defining portion 16A has a first top surface T1 that is a surface farthest from the top surface of the substrate 1, and the width portion 16B has a second top surface T2 that is a surface farthest from the top surface of the substrate 1. The second top surface T2 is located farther from the top surface of the substrate 1 than the first top surface T1. The remainder of features of the pole layer 16 of the second embodiment are the same as those of the pole layer 16 of the first embodiment.

Reference is now made to FIG. 20A to FIG. 23B to describe the method of manufacturing the magnetic head of the second embodiment. In FIG. 20A to FIG. 23B, 'ABS' indicates an imaginary plane located at the target position of the medium facing surface 30. The portions located below the encasing layer 12 are omitted in FIG. 20A to FIG. 23B.

The method of manufacturing the magnetic head of the second embodiment includes the steps up to the step of forming the magnetic layer 16P that are the same as those of the first embodiment.

Figure 20A:
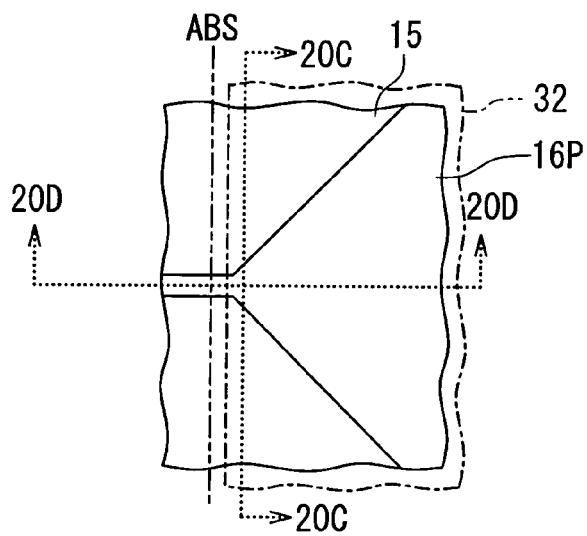
FIG. 20A to FIG. 20D are views for illustrating a step of a method of manufacturing the magnetic head of the second embodiment of the invention.
Figure 20B:
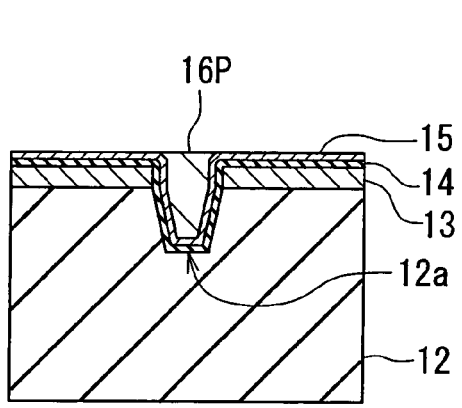
Figure 20C:
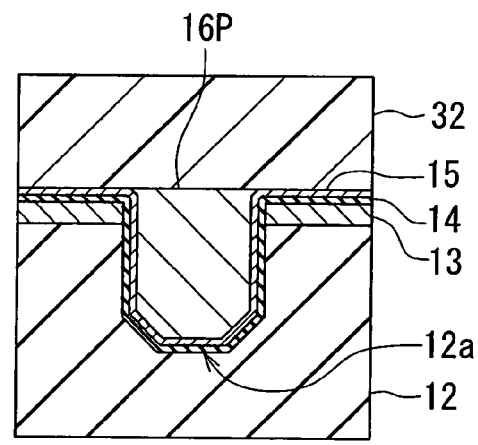
Figure 20D:
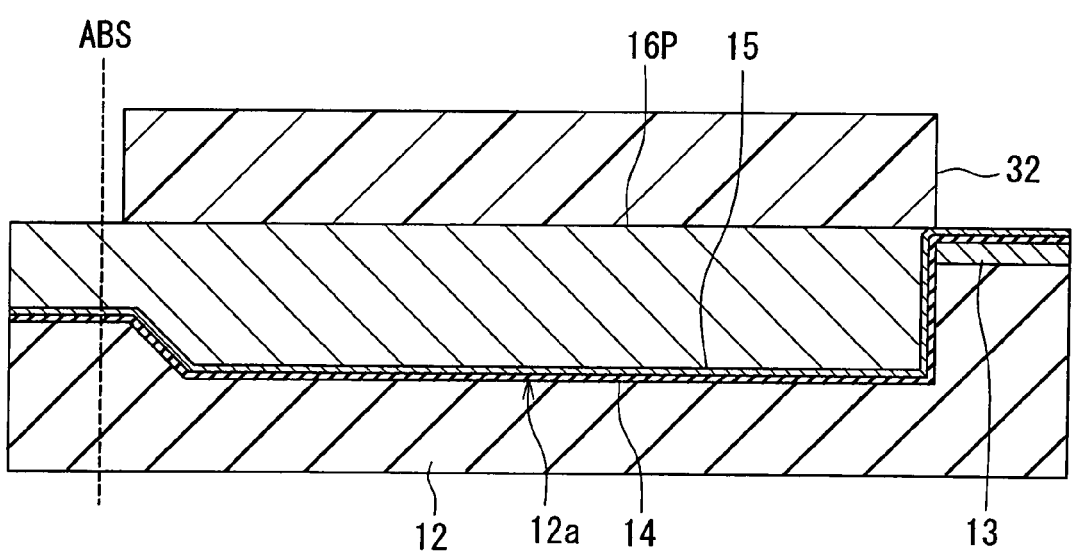

FIG. 20A to FIG. 20D illustrate the following step. FIG. 20A is a top view of a layered structure obtained in the manufacturing process of the magnetic head. FIG. 20B is a cross-sectional view illustrating a cross section of the layered structure of FIG. 20A taken in the plane ABS. FIG. 20C is a cross-sectional view illustrating a cross section of the layered structure of FIG. 20A taken along line 20C-20C. FIG. 20D is a cross-sectional view illustrating a cross section of the layered structure of FIG. 20A taken along line 20D-20D.

In the step, first, a coating layer not shown made of alumina, for example, is formed on the entire top surface of the layered structure. Next, the coating layer and the magnetic layer 16P are polished by CMP, for example, so that the polishing stopper layer 15 is exposed, and the top surfaces of the polishing stopper layer 15 and the magnetic layer 16P are thereby flattened.

Next, a mask 32 is formed on the polishing stopper layer 15 and the magnetic layer 16P. The mask 32 covers a portion of the top surface of the magnetic layer 16P that is to be the second top surface T2. The mask 32 is formed by patterning a photoresist layer by photolithography, for example.

Figure 21A:
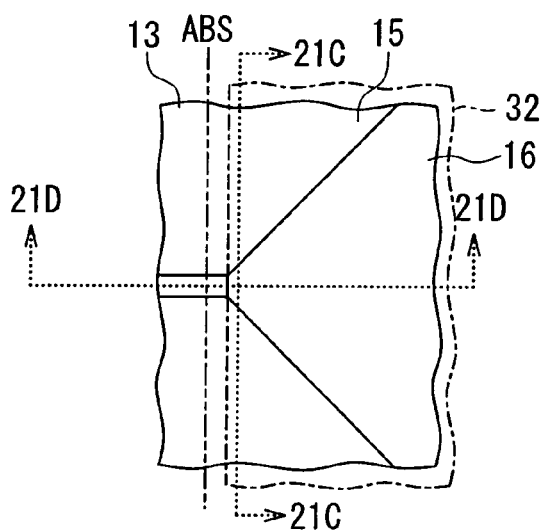
FIG. 21A to FIG. 21D are views for illustrating a step that follows the step of FIG. 20A to FIG. 20D.
Figures 21B, 21C:
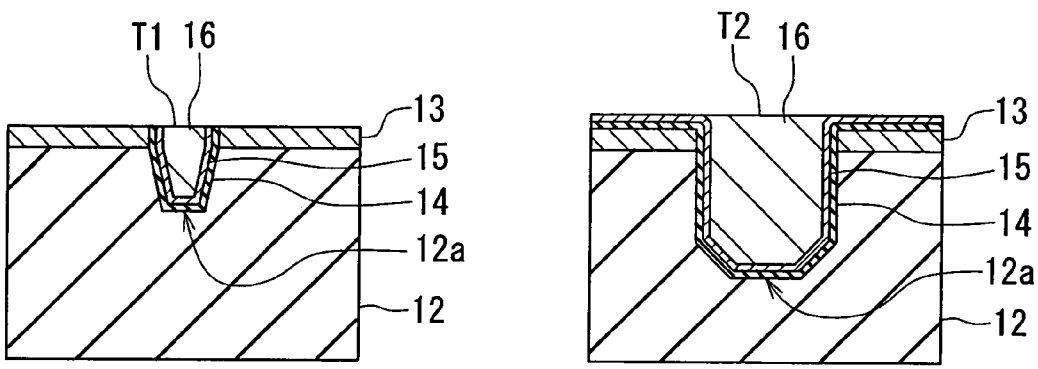
Figure 21D:
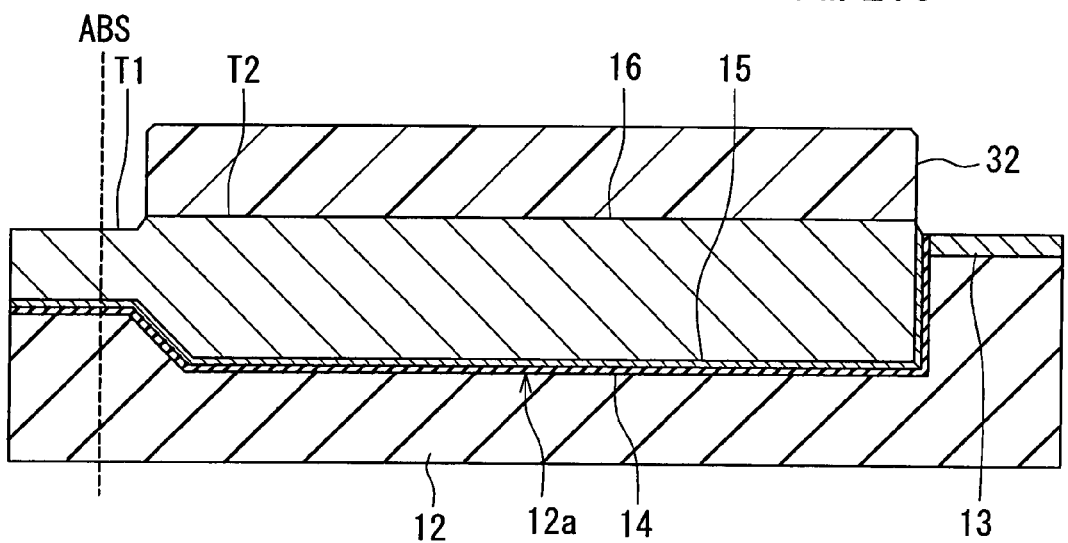

FIG. 21A to FIG. 21D illustrate the following step. FIG. 21A is a top view of a layered structure obtained in the manufacturing process of the magnetic head. FIG. 21B is a cross-sectional view illustrating a cross section of the layered structure of FIG. 21A taken in the plane ABS. FIG. 21C is a cross-sectional view illustrating a cross section of the layered structure of FIG. 21A taken along line 21C-21C. FIG. 21D is a cross-sectional view illustrating a cross section of the layered structure of FIG. 21A taken along line 21D-21D.

In the step, portions of the magnetic layer 16P, the polishing stopper layer 15 and the nonmagnetic film 14 located in the region that is not covered with the mask 32 are etched by ion beam etching, for example. As a result, the top surfaces T1 and T2 are formed in the top surface of the magnetic layer 16P, and the magnetic layer 16P is thereby formed into the pole layer 16. The mask 32 is then removed.

Figure 22A:
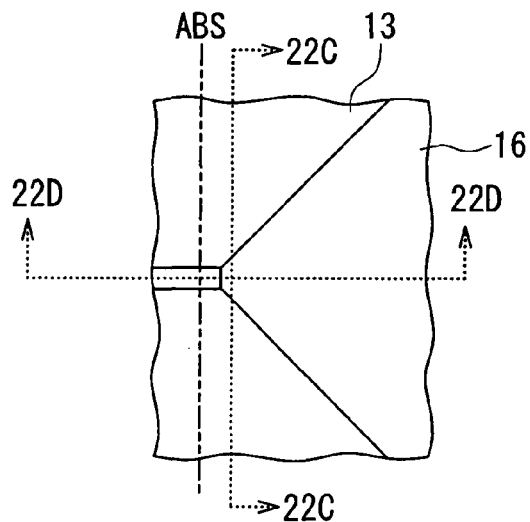
FIG. 22A to FIG. 22D are views for illustrating a step that follows the step of FIG. 21A to FIG. 21D.
Figure 22B:
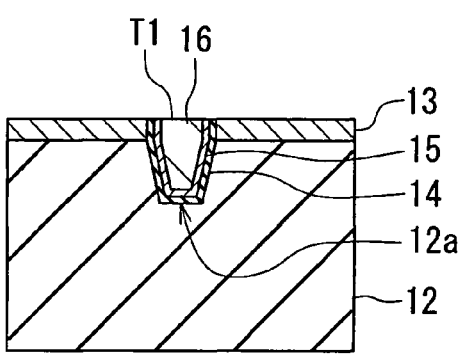
Figure 22C:
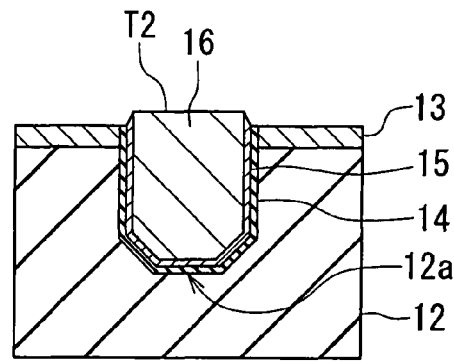
Figure 22D:
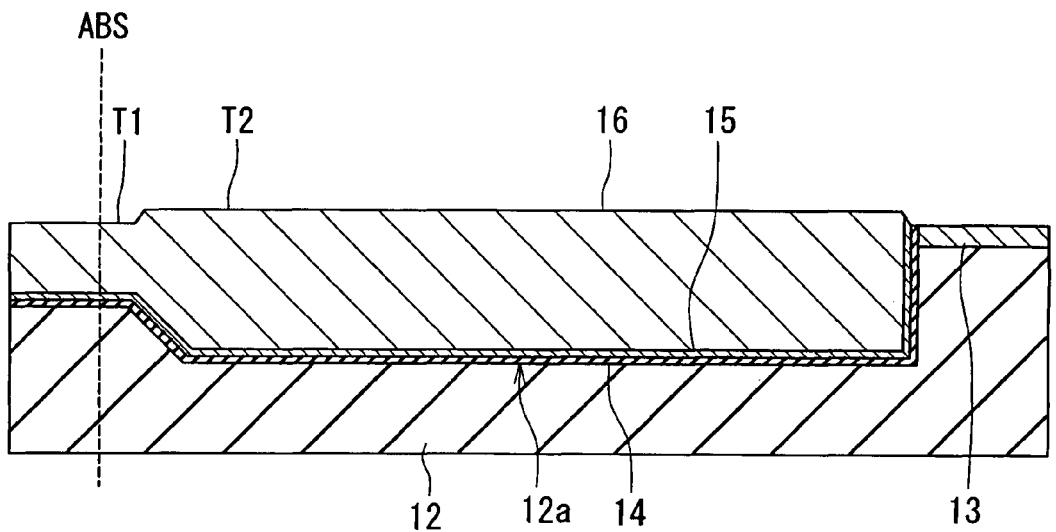

FIG. 22A to FIG. 22D illustrate the following step. FIG. 22A is a top view of a layered structure obtained in the manufacturing process of the magnetic head. FIG. 22B is a cross-sectional view illustrating a cross section of the layered structure of FIG. 22A taken in the plane ABS. FIG. 22C is a cross-sectional view illustrating a cross section of the layered structure of FIG. 22A taken along line 22C-22C. FIG. 22D is a cross-sectional view illustrating a cross section of the layered structure of FIG. 22A taken along line 22D-22D. In this step, portions of the polishing stopper layer 15 and the nonmagnetic film 14 around the second top surface T2 of the pole layer 16 are etched by ion beam etching, for example.

Figure 23A:
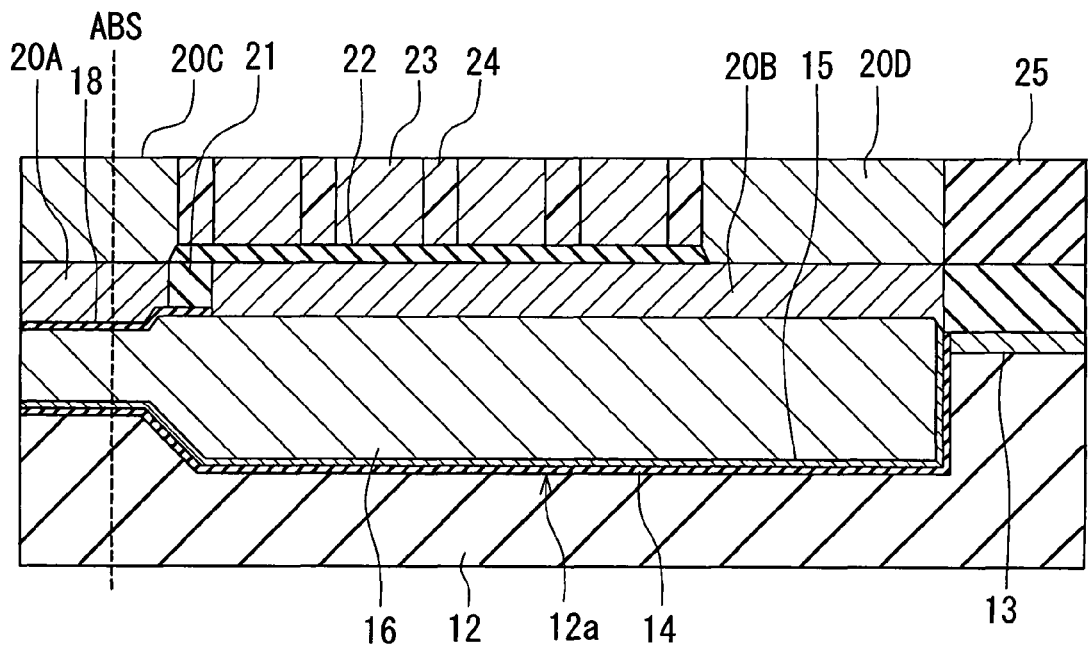
FIG. 23A and FIG. 23B are views for illustrating a step that follows the step of FIG. 22A to FIG. 22D.
Figure 23B:
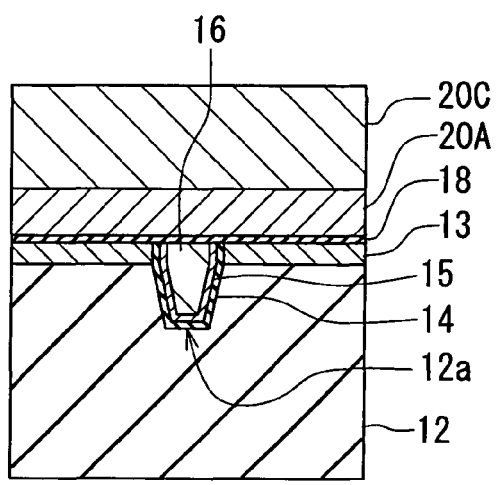

FIG. 23A and FIG. 23B illustrate the following step. FIG. 23A is a cross-sectional view of a layered structure obtained in the manufacturing process of the magnetic head. FIG. 23B is a cross-sectional view illustrating a cross section of the layered structure of FIG. 23A taken in the plane ABS. In the step, first, the gap layer 18 is formed on the entire top surface of the layered structure. The gap layer 18 is formed by sputtering or CVD, for example. In the case of forming the gap layer 18 by CVD, it is preferred to employ ALCVD, in particular. In the case of employing ALCVD to form the gap layer 18, it is preferred to choose alumina as the material of the gap layer 18. The gap layer 18 formed by ALCVD exhibits a good step coverage. Employing ALCVD to form the gap layer 18 thus allows the resulting gap layer 18 to be uniform on the pole layer 16 that is not flat.

Next, a portion of the gap layer 18 away from the medium facing surface 30 is selectively etched to form an opening in the gap layer 18. Next, the first layer 20A is formed on the gap layer 18, and the yoke layer 20B is formed on a portion of the pole layer 16 where the opening of the gap layer 18 is formed. Next, the nonmagnetic layer 21 is formed on the entire top surface of the layered structure. Next, the nonmagnetic layer 21 is polished by CMP, for example, so that the first layer 20A and the yoke layer 20B are exposed, and the top surfaces of the first layer 20A, the yoke layer 20B and the nonmagnetic layer 21 are flattened.

Next, the insulating layer 22 is formed on regions of the top surfaces of the yoke layer 20B and the nonmagnetic layer 21 in which the coil 23 is to be disposed. Next, the coil 23 is formed by frame plating, for example, such that at least part of the coil 23 is disposed on the insulating layer 22. Next, the second layer 20C and the coupling layer 20D are formed by frame plating, for example. Alternatively, the coil 23 may be formed after the second layer 20C and the coupling layer 20D are formed.

Next, the insulating layer 24 made of photoresist, for example, is selectively formed around the coil 23 and in the space between the respective adjacent turns of the coil 23. Next, the insulating layer 25 is formed on the entire top surface of the layered structure. Next, the insulating layer 25 is polished by CMP, for example, so that the second layer 20C, the coupling layer 20D and the coil 23 are exposed, and the top surfaces of the second layer 20C, the coupling layer 20D, the coil 23 and the insulating layers 24 and 25 are thereby flattened.

The following steps of the second embodiment are the same as those of the first embodiment. First, the insulating layer 26 is formed on the coil 23 and the insulating layers 24 and 25. Next, the third layer 20E is formed by frame plating, for example, to complete the shield layer 20. Next, the protection layer 27 is formed to cover the entire top surface of the layered structure. Wiring and terminals are then formed on the protection layer 27, the substrate is cut into sliders, and the steps including polishing of the medium facing surface 30 and fabrication of flying rails are performed. The magnetic head is thus completed.

In the second embodiment, the track width defining portion 16A has the first top surface T1 that is the surface farthest from the top surface of the substrate 1, and the wide portion 16B has the second top surface T2 that is the surface farthest from the top surface of the substrate 1. The second top surface T2 is located farther from the top surface of the substrate 1 than the first top surface T1. As a result, according to the embodiment, it is possible to reduce the thickness of the pole layer 16 taken in the medium facing surface 30 so as to effectively prevent occurrences of problems resulting from a skew while increasing the thickness of the track width defining portion 16A so as to introduce a magnetic flux of great magnitude to the medium facing surface 30 through the pole layer 16.

The remainder of configuration, function and effects of the second embodiment are similar to those of the first embodiment. Modifications of the second embodiment similar to the first to fourth modification examples of the first embodiment are also possible.

Third Embodiment

Figure 24:
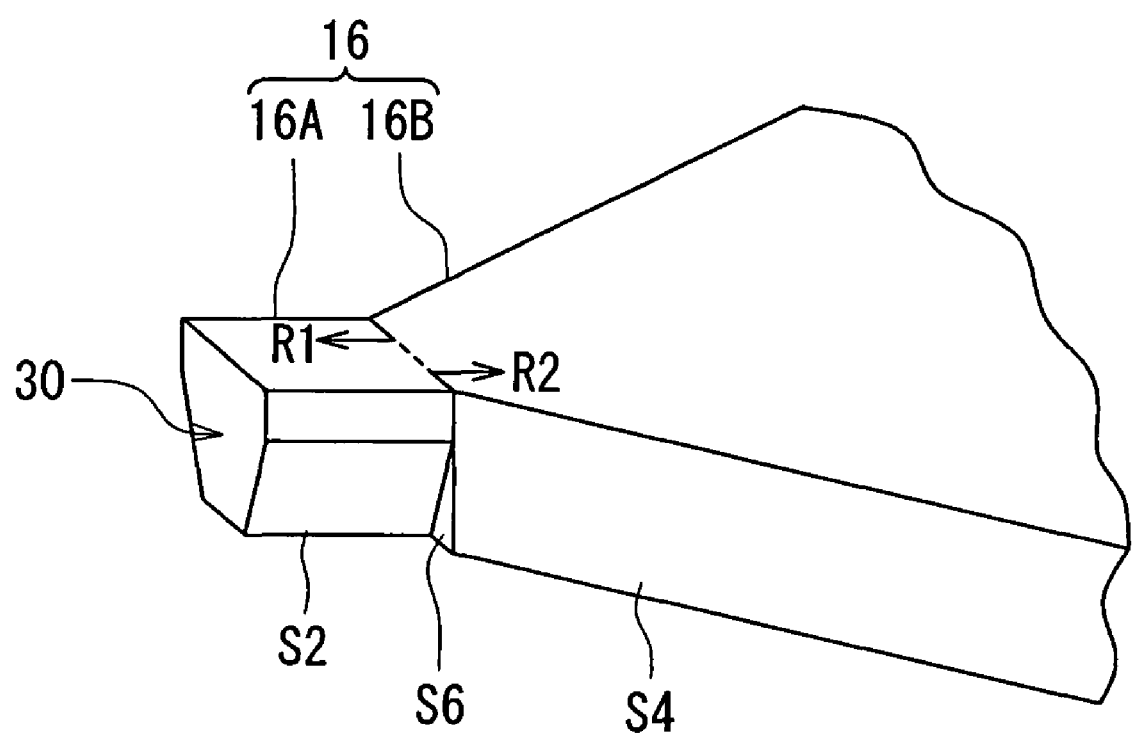
FIG. 24 is a perspective view illustrating a portion of a pole layer of a magnetic head of a third embodiment of the invention.

A magnetic head and a method of manufacturing the same of a third embodiment of the invention will now be described. Reference is now made to FIG. 24 to describe an example of the shape of the pole layer 16 of the third embodiment. The pole layer 16 of FIG. 24 has a flat bottom surface. The remainder of features of the pole layer 16 of FIG. 24 are the same as those of the pole layer 16 of the first embodiment.

Figure 25:
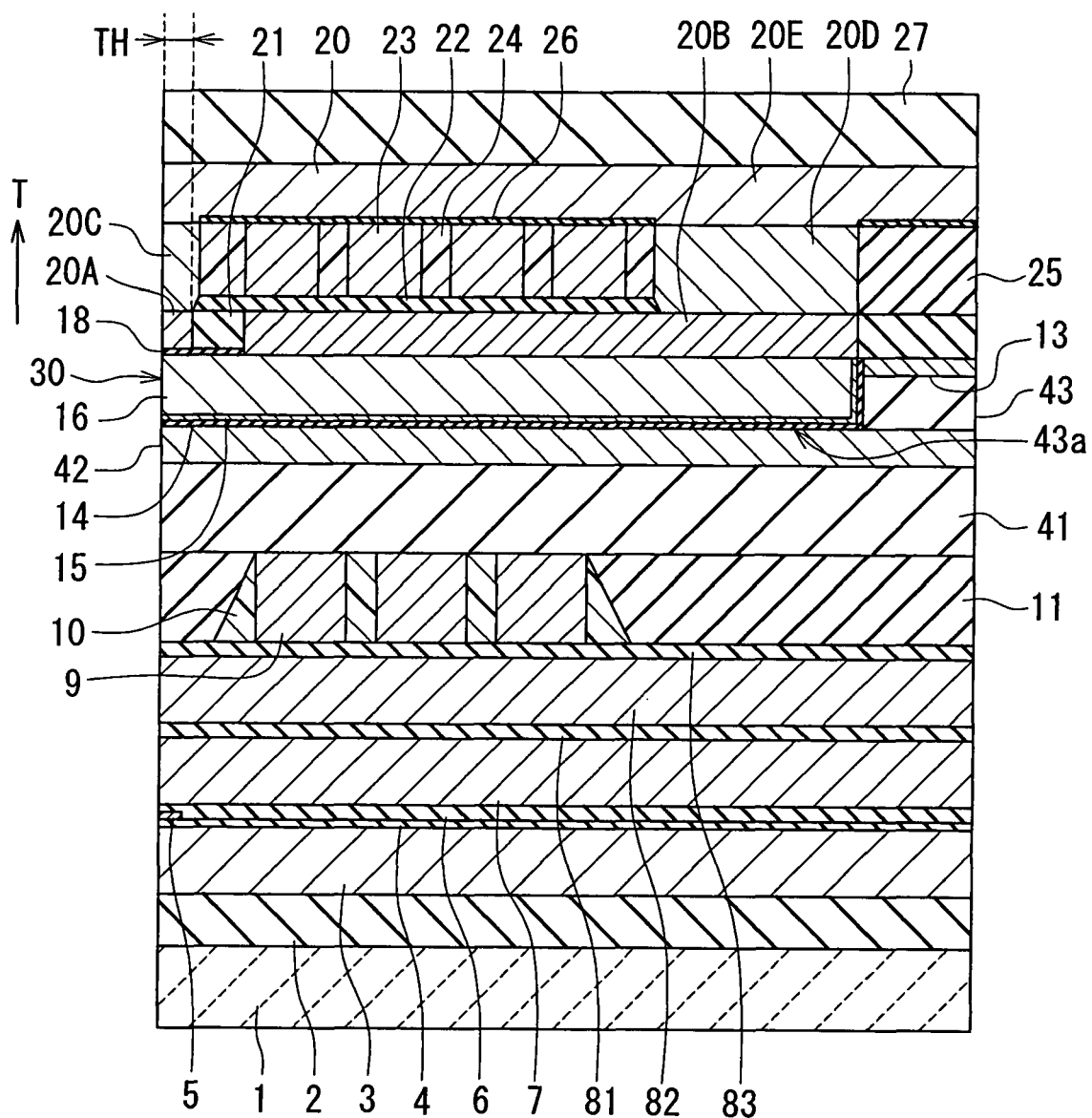
FIG. 25 is a cross-sectional view for illustrating the configuration of the magnetic head of the third embodiment of the invention.
Figure 26:
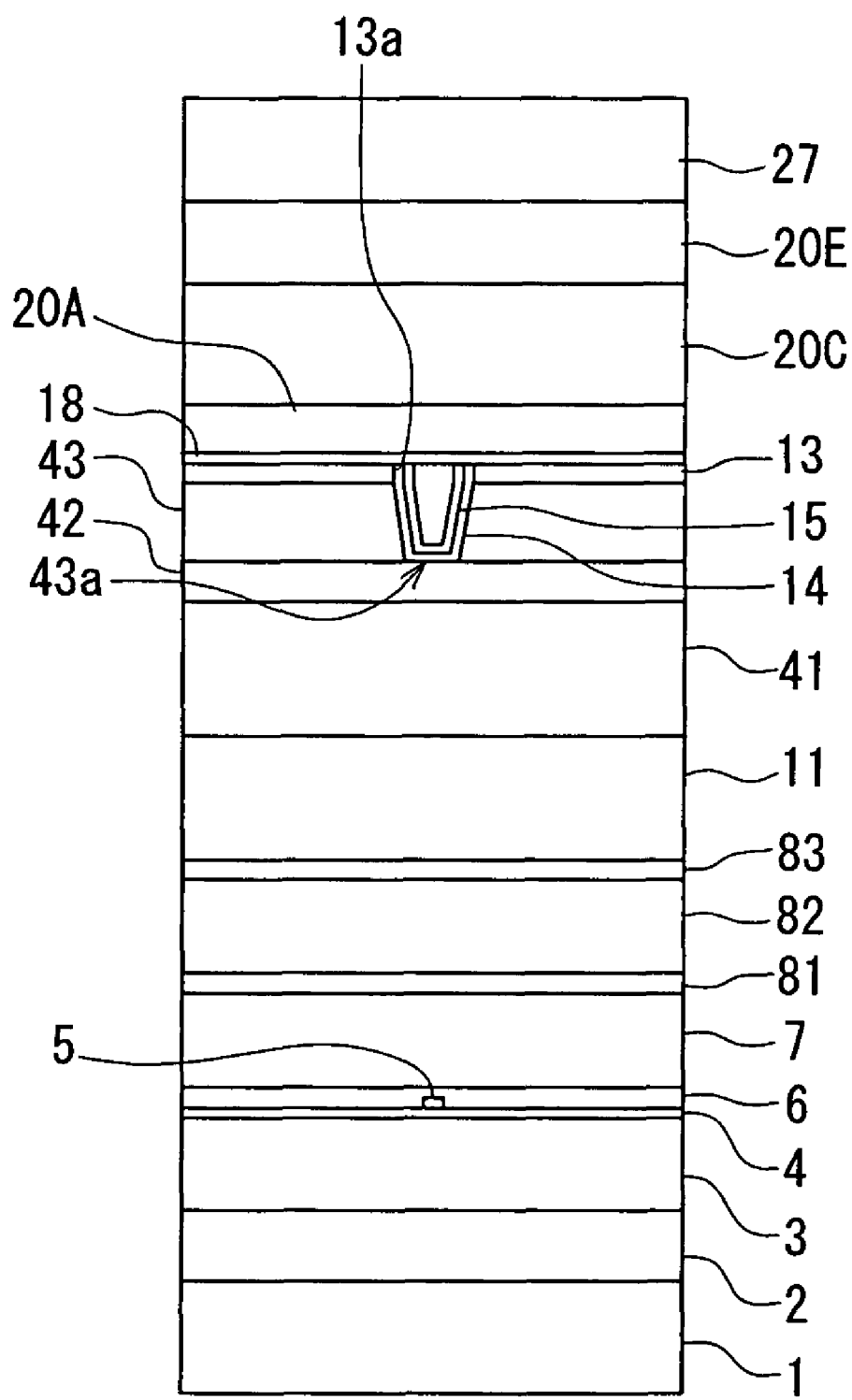
FIG. 26 is a front view of the medium facing surface of the magnetic head of the third embodiment of the invention.

Reference is now made to FIG. 25 and FIG. 26 to describe the configuration of the magnetic head of the third embodiment. FIG. 25 is a cross-sectional view for illustrating the configuration of the magnetic head of the embodiment. FIG. 26 is a front view of the medium facing surface of the magnetic head of the embodiment. FIG. 25 illustrates a cross section orthogonal to the medium facing surface and the plane of the substrate. The arrow indicated with T in FIG. 25 shows the direction of travel of a recording medium.

In place of the encasing layer 12 of the first embodiment, the magnetic head of the third embodiment incorporates: a nonmagnetic layer 41 made of a nonmagnetic material and disposed on the top surfaces of the coil 9 and the insulating layers 10 and 11; a bottom forming layer 42 disposed on the nonmagnetic layer 41; and an encasing layer 43 disposed on the bottom forming layer 42. The nonmagnetic layer 41 is made of alumina, for example. The bottom forming layer 42 can be made of any of Ru, NiB, NiP, NiCr, Pd, V, Cr, Nb, Te, Rh, Ir, Re, TaO, Rb, Cs, NiCu, NiPd, AlN, AlF, SiC, and TiC, for example. SiC is particularly preferable as the material of the bottom forming layer 42. The encasing layer 43 has an encasing groove 43a that opens in the top surface thereof. The material of the encasing layer 43 is the same as that of the encasing layer 12 of the first embodiment.

The bottom forming layer 42 is disposed between the encasing layer 43 and the substrate 1 and touches the encasing layer 43. At least part of a portion of the encasing groove 43a located in the second region R2 penetrates the encasing layer 43. The bottom of the portion of the encasing groove 43a that penetrates the encasing layer 43 is formed by the top surface of the bottom forming layer 42. At least part of the pole layer 16 is placed in the space surrounded by the top surface of the bottom forming layer 42 and the wall surface of the encasing groove 43a.

FIG. 25 illustrates an example in which the entire encasing groove 43a penetrates the encasing layer 43. Example in which a portion of the encasing groove 43a located in the first region R1 does not penetrate the encasing layer 43 will be shown later as first and second modification examples.

Reference is now made to FIG. 27A to FIG. 32B to describe the method of manufacturing the magnetic head illustrated in FIG. 25 and FIG. 26. In FIG. 27A to FIG. 32B, 'ABS' indicates an imaginary plane located at the target position of the medium facing surface 30. The portions located below the nonmagnetic layer 41 are omitted in FIG. 27A to FIG. 32B. The method of manufacturing the magnetic head of the third embodiment includes the steps up to the step of flattening the top surfaces of the coil 9 and the insulating layers 10 and 11 that are the same as those of the first embodiment.

Figure 27A:
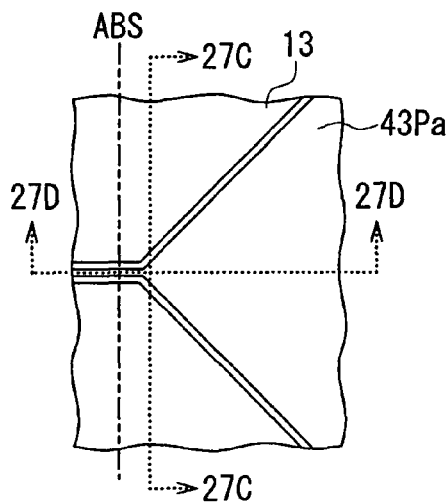
FIG. 27A to FIG. 27D are views for illustrating a step of a method of manufacturing the magnetic head of the third embodiment of the invention.
Figure 27B:
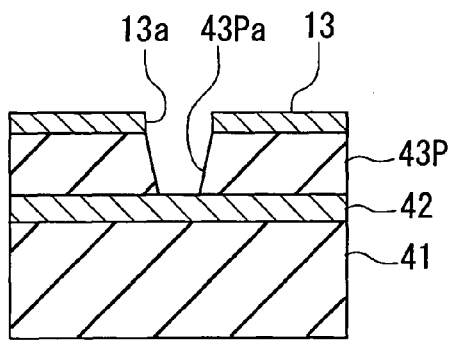
Figure 27C:
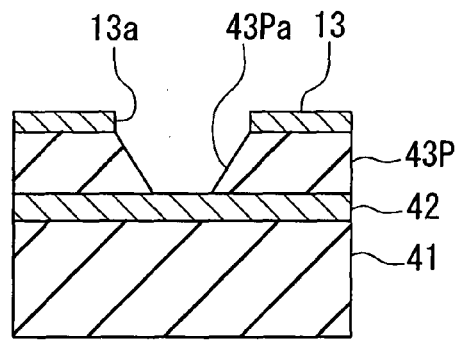
Figure 27D:
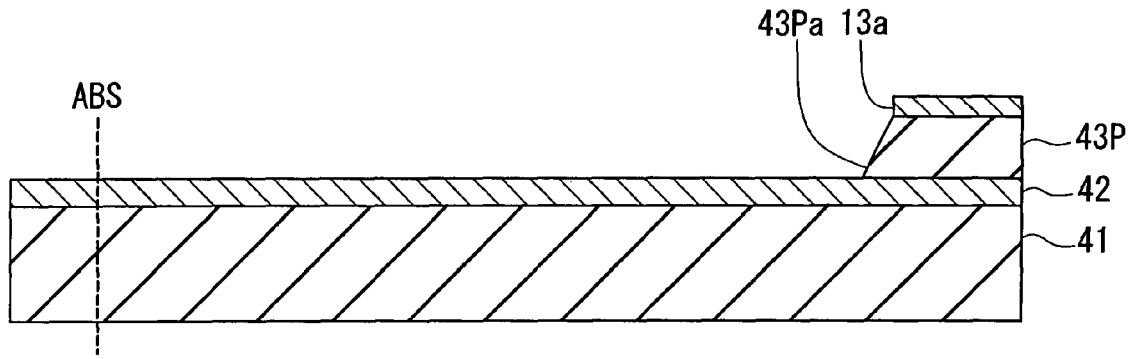

FIG. 27A to FIG. 27D illustrate the following step. FIG. 27A is a top view of a layered structure obtained in the manufacturing process of the magnetic head. FIG. 27B is a cross-sectional view illustrating a cross section of the layered structure of FIG. 27A taken in the plane ABS. FIG. 27C is a cross-sectional view illustrating a cross section of the layered structure of FIG. 27A taken along line 27C-27C. FIG. 27D is a cross-sectional view illustrating a cross section of the layered structure of FIG. 27A taken along line 27D-27D.

In the step, first, the nonmagnetic layer 41 and the bottom forming layer 42 are formed in this order on the flattened top surfaces of the coil 9 and the insulating layers 10 and 11. Next, on the bottom forming layer 42 there is formed a nonmagnetic layer 43P that is to be the encasing layer 43 later by undergoing formation of the encasing groove 43a therein. Next, the encasing groove defining layer 13 is formed by sputtering, for example, on the nonmagnetic layer 43P. Next, as in the first embodiment, the encasing groove defining layer 13 is etched using a photoresist mask to thereby form the opening 13a in the encasing groove defining layer 13. Next, as in the first embodiment, a portion of the nonmagnetic layer 43P exposed from the opening 13a of the encasing groove defining layer 13 is selectively etched, using the photoresist mask and the encasing groove defining layer 13 as etching masks, to thereby form in the nonmagnetic layer 43P an initial groove 43Pa that is to be the encasing groove 43a later by undergoing etching. This step of forming the initial groove 43Pa is called a first etching step. Next, the photoresist mask is removed. The edge of the opening 13a of the encasing groove defining layer 13 is located directly above the edge of the initial groove 43Pa in the top surface of the nonmagnetic layer 43P.

In the manufacturing method of the magnetic head of FIG. 25, in the first etching step, the nonmagnetic layer 43P is etched so that the entire initial groove 43Pa penetrates the nonmagnetic layer 43P and that the entire bottom of the initial groove 43Pa thereby reaches the top surface of the bottom forming layer 42. The etching method of the first etching step is the same as that of the first embodiment.

The first etching step is performed such that a portion of the wall surface of the initial groove 43Pa that is to be opposed to the first and second side surfaces S1 and S2 of the pole layer 16 forms an angle within a range of 5 to 15 degrees inclusive, for example, or preferably within a range of 8 to 12 degrees inclusive, with respect to the direction orthogonal to the top surface of the substrate 1. After the first etching step, the angle formed by a portion of the wall surface of the initial groove 43Pa located in the second region R2 with respect to the direction orthogonal to the top surface of the substrate 1 is about once to twice the angle formed by the portion of the wall surface of the initial groove 43Pa that is to be opposed to the first and second side surfaces S1 and S2 of the pole layer 16 with respect to the direction orthogonal to the top surface of the substrate 1.

Figure 28A:
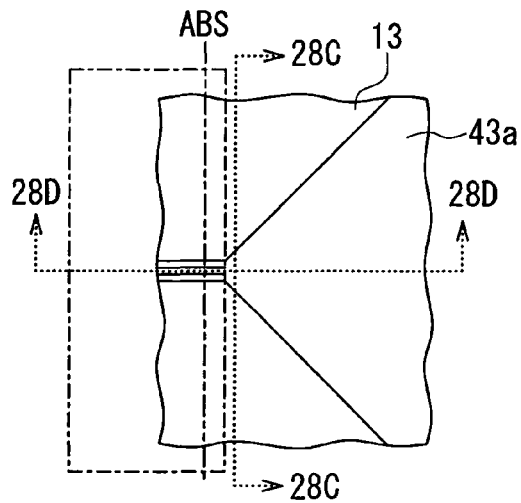
FIG. 28A to FIG. 28D are views for illustrating a step that follows the step of FIG. 27A to FIG. 27D.
Figures 28B, 28C:
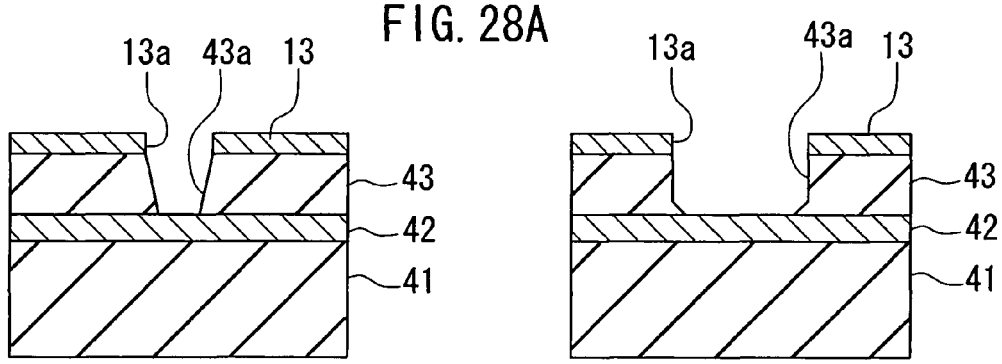
Figure 28D:
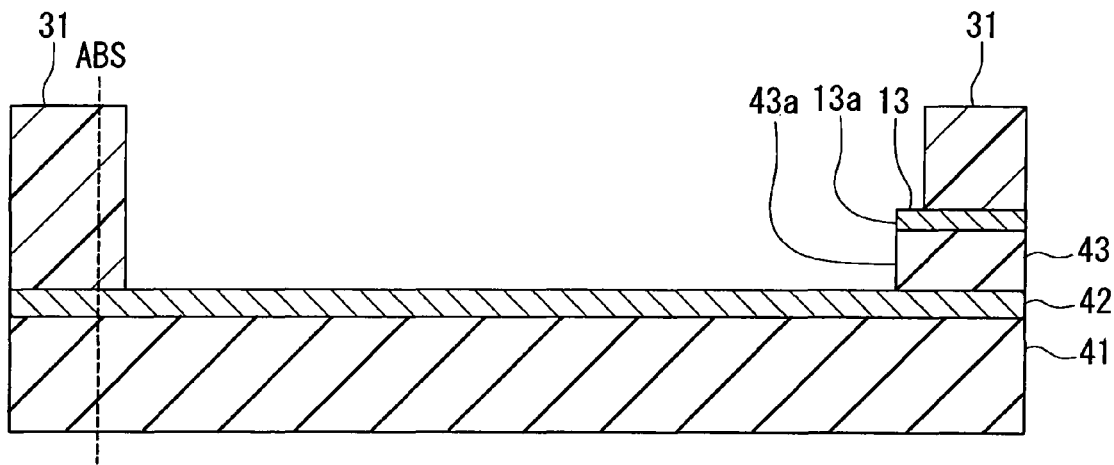

FIG. 28A to FIG. 28D illustrate the following step. FIG. 28A is a top view of a layered structure obtained in the manufacturing process of the magnetic head. FIG. 28B is a cross-sectional view illustrating a cross section of the layered structure of FIG. 28A taken in the plane ABS. FIG. 28C is a cross-sectional view illustrating a cross section of the layered structure of FIG. 28A taken along line 28C-28C. FIG. 28D is a cross-sectional view illustrating a cross section of the layered structure of FIG. 28A taken along line 28D-28D.

In the step, first, the mask 31 is formed on portions of the encasing groove defining layer 13 and the initial groove 43Pa located in the first region R1. Next, a portion of the initial groove 43Pa that is not covered with the mask 31, that is, a portion of the initial groove 43Pa located in the second region R2, is only etched to complete the encasing groove 43a. This step is called a second etching step. The etching method employed in the second etching step is the same as that of the first embodiment. Next, the mask 31 is removed.

The second etching step is performed so that, for example, the angle formed by the portion of the wall surface of the encasing groove 43a located in the second region R2 with respect to the direction orthogonal to the top surface of the substrate 1 is made smaller than the angle formed by the portion of the wall surface of the encasing groove 43a located in the first region R1 with respect to the direction orthogonal to the top surface of the substrate 1. Alternatively, the second etching step is performed so that the width of the portion of the encasing groove 43a located in the second region R2 increases with decreasing distance from the top surface of the substrate 1.

In this step, the encasing groove 43a is completed by etching only the portion of the initial groove 43Pa located in the second region R2 using the mask 31 and the encasing groove defining layer 13 as etching masks. As a result, the position of the portion of the wall surface of the encasing groove 43a located in the second region R2 is defined with precision by the edge of the opening 13a of the encasing groove defining layer 13.

In the first etching step, portions of the encasing groove 43a that are to be opposed to the first and second side surfaces S1 and S2 of the pole layer 16 are formed. In the second etching step, portions of the encasing groove 43a that are to be opposed to the third to sixth side surfaces S3, S4, S5 and S6 of the pole layer 16 are formed.

Figure 29A:
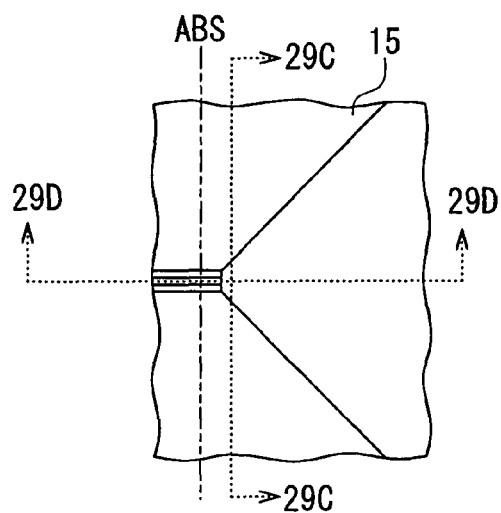
FIG. 29A to FIG. 29D are views for illustrating a step that follows the step of FIG. 28A to FIG. 28D.
Figure 29B:
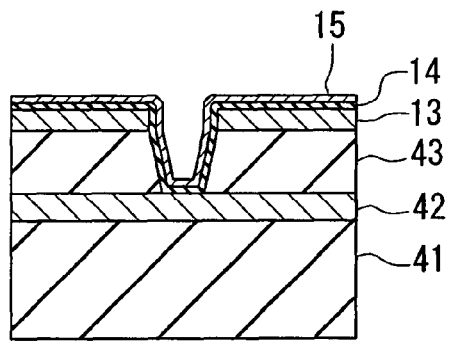
Figure 29C:
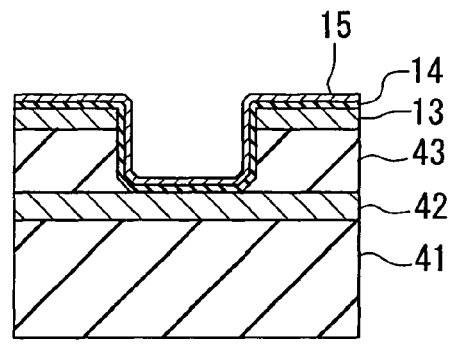
Figure 29D:
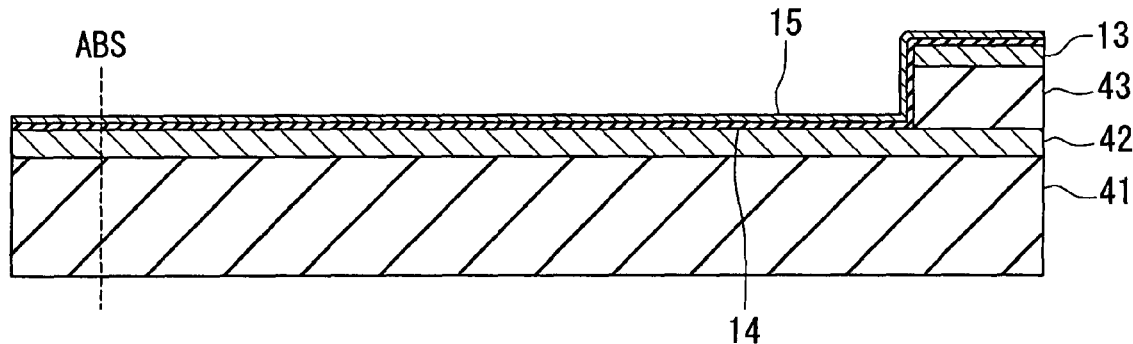

FIG. 29A to FIG. 29D illustrate the following step. FIG. 29A is a top view of a layered structure obtained in the manufacturing process of the magnetic head. FIG. 29B is a cross-sectional view illustrating a cross section of the layered structure of FIG. 29A taken in the plane ABS. FIG. 29C is a cross-sectional view illustrating a cross section of the layered structure of FIG. 29A taken along line 29C-29C. FIG. 29D is a cross-sectional view illustrating a cross section of the layered structure of FIG. 29A taken along line 29D-29D.

In the step, first, the nonmagnetic film 14 and the polishing stopper layer 15 are formed in this order on the entire top surface of the layered structure. The nonmagnetic film 14 and the polishing stopper layer 15 are formed in the encasing groove 43a, too. The method of forming each of the nonmagnetic film 14 and the polishing stopper layer 15 is the same as that of the first embodiment.

Figure 30A:
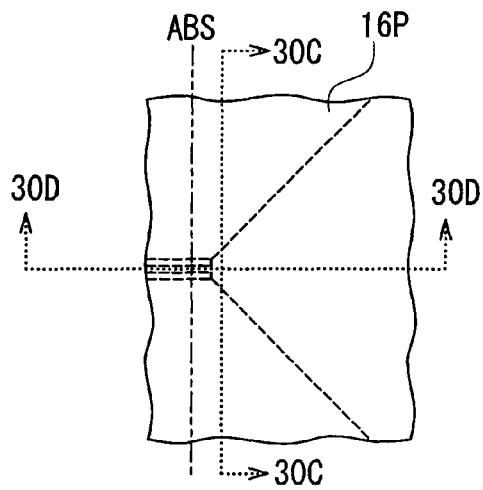
FIG. 30A to FIG. 30D are views for illustrating a step that follows the step of FIG. 29A to FIG. 29D.
Figure 30B:
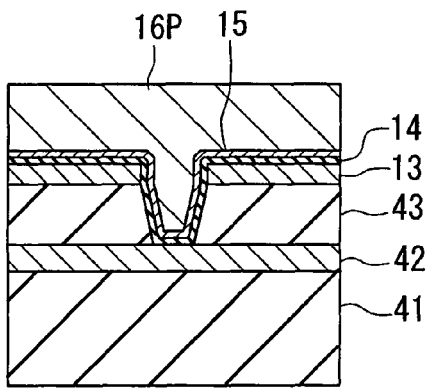
Figure 30C:
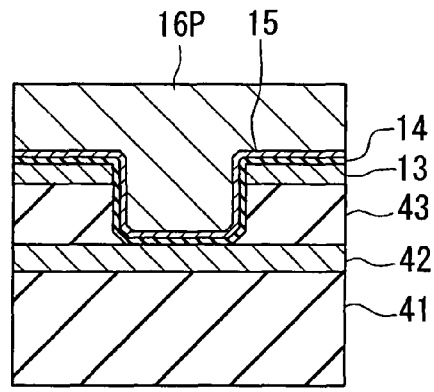
Figure 30D:
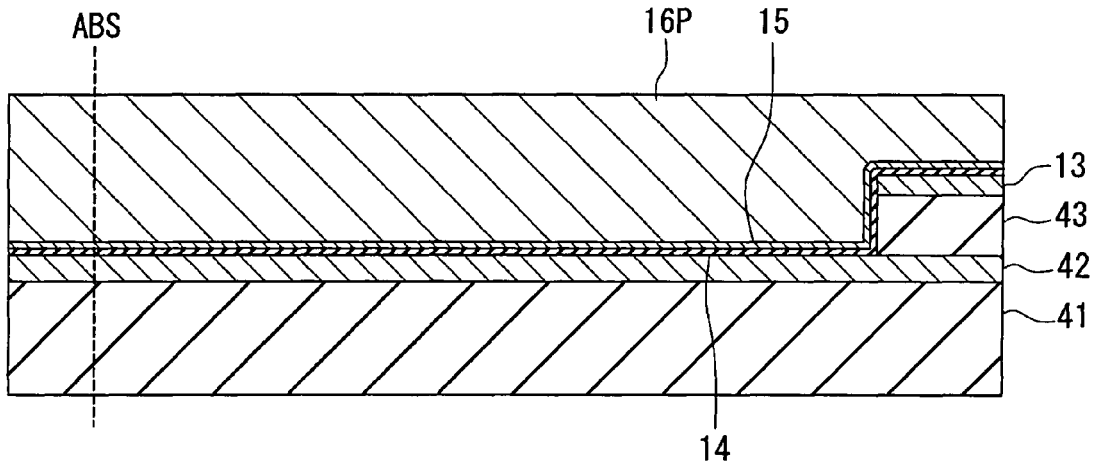

FIG. 30A to FIG. 30D illustrate the following step. FIG. 30A is a top view of a layered structure obtained in the manufacturing process of the magnetic head. FIG. 30B is a cross-sectional view illustrating a cross section of the layered structure of FIG. 30A taken in the plane ABS. FIG. 30C is a cross-sectional view illustrating a cross section of the layered structure of FIG. 30A taken along line 30C-30C. FIG. 30D is a cross-sectional view illustrating a cross section of the layered structure of FIG. 30A taken along line 30D-30D.

In the step, the magnetic layer 16P that is to be the pole layer 16 later is formed. The magnetic layer 16P is formed such that the top surface thereof is located higher than the top surfaces of the encasing groove defining layer 13, the nonmagnetic film 14 and the polishing stopper layer 15. The method of forming the magnetic layer 16P is the same as that of the first embodiment.

Figure 31A:
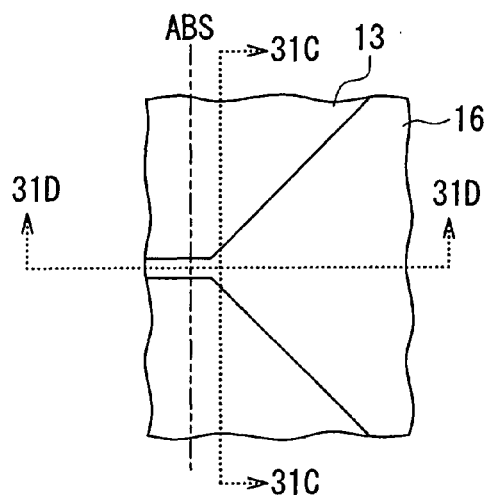
FIG. 31A to FIG. 31D are views for illustrating a step that follows the step of FIG. 30A to FIG. 30D.
Figure 31B:
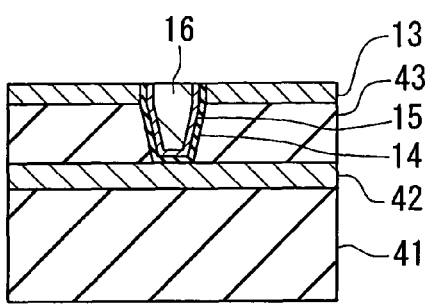
Figure 31C:
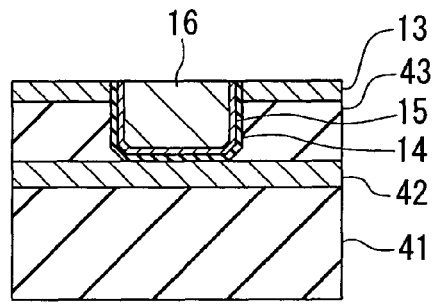
Figure 31D:
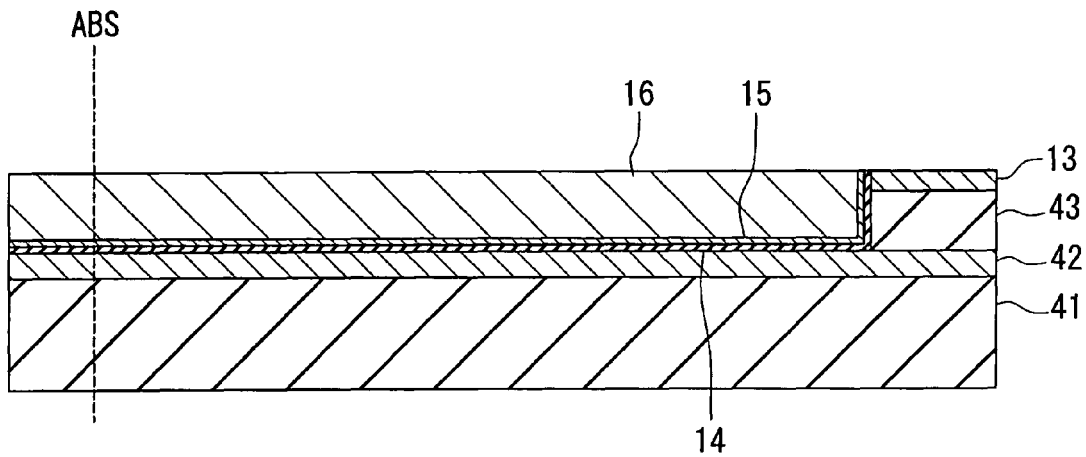

FIG. 31A to FIG. 31D illustrate the following step. FIG. 31A is a top view of a layered structure obtained in the manufacturing process of the magnetic head. FIG. 31B is a cross-sectional view illustrating a cross section of the layered structure of FIG. 31A taken in the plane ABS. FIG. 31C is a cross-sectional view illustrating a cross section of the layered structure of FIG. 31A taken along line 31C-31C. FIG. 31D is a cross-sectional view illustrating a cross section of the layered structure of FIG. 31A taken along line 31D-31D. In this step, the top surfaces of the encasing groove defining layer 13, the nonmagnetic film 14, the polishing stopper layer 15 and the magnetic layer 16P are flattened in the same manner as the first embodiment. The magnetic layer 16P is thereby formed into the pole layer 16.

Figure 32A:
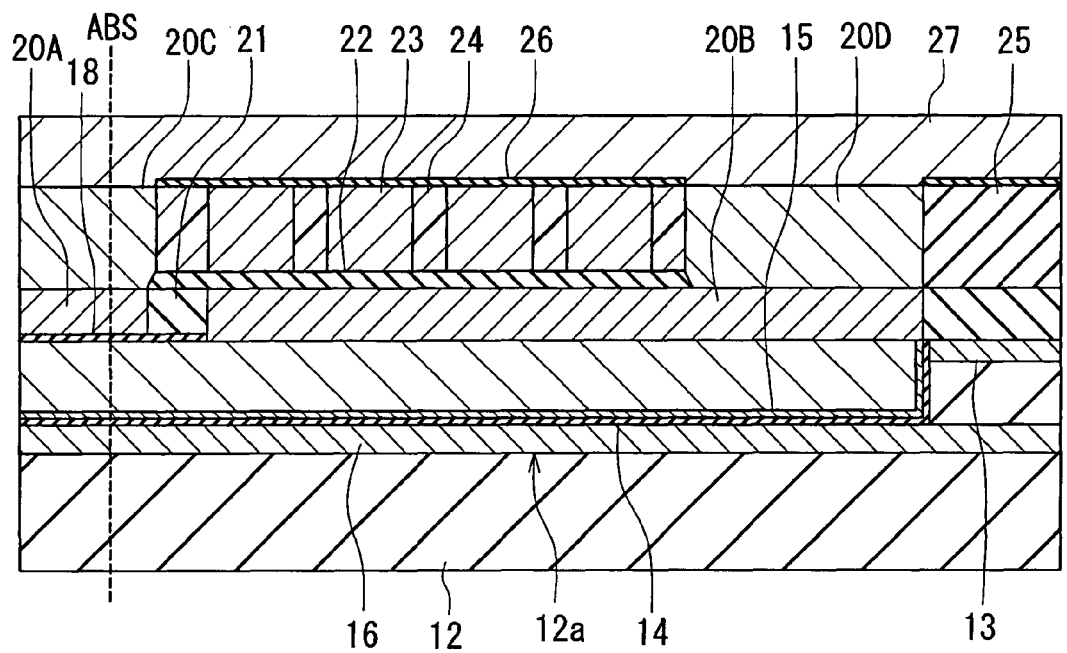
FIG. 32A and FIG. 32B are views for illustrating a step that follows the step of FIG. 31A to FIG. 31D.
Figure 32B:
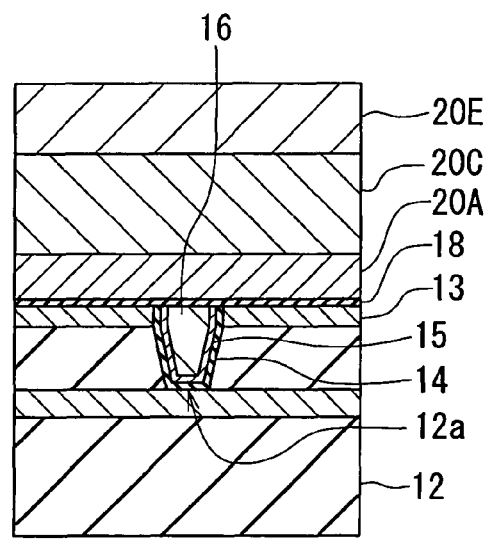

FIG. 32A and FIG. 32B illustrate the following step. FIG. 32A is a cross-sectional view of a layered structure obtained in the manufacturing process of the magnetic head. FIG. 32B is a cross-sectional view illustrating a cross section of the layered structure of FIG. 32A taken in the plane ABS. In the step, first, the gap layer 18 is formed on the entire top surface of the layered structure. Next, a portion of the gap layer 18 away from the medium facing surface 30 is selectively etched to form an opening in the gap layer 18. Next, the first layer 20A is formed on the gap layer 18, and the yoke layer 20B is formed on a portion of the pole layer 16 where the opening of the gap layer 18 is formed. Next, the nonmagnetic layer 21 is formed on the entire top surface of the layered structure. Next, the nonmagnetic layer 21 is polished by CMP, for example, so that the first layer 20A and the yoke layer 20B are exposed, and the top surfaces of the first layer 20A, the yoke layer 20B and the nonmagnetic layer 21 are flattened.

Next, the insulating layer 22 is formed on regions of the top surfaces of the yoke layer 20B and the nonmagnetic layer 21 in which the coil 23 is to be disposed. Next, the coil 23 is formed by frame plating, for example, such that at least part of the coil 23 is disposed on the insulating layer 22. Next, the second layer 20C and the coupling layer 20D are formed by frame plating, for example. Alternatively, the coil 23 may be formed after the second layer 20C and the coupling layer 20D are formed.

Next, the insulating layer 24 made of photoresist, for example, is selectively formed around the coil 23 and in the space between the respective adjacent turns of the coil 23. Next, the insulating layer 25 is formed on the entire top surface of the layered structure. Next, the insulating layer 25 is polished by CMP, for example, so that the second layer 20C, the coupling layer 20D and the coil 23 are exposed, and the top surfaces of the second layer 20C, the coupling layer 20D, the coil 23 and the insulating layers 24 and 25 are thereby flattened.

The following steps of the third embodiment are the same as those of the first embodiment. First, the insulating layer 26 is formed on the coil 23 and the insulating layers 24 and 25. Next, the third layer 20E is formed by frame plating, for example, to complete the shield layer 20. Next, the protection layer 27 is formed to cover the entire top surface of the layered structure. Wiring and terminals are then formed on the protection layer 27, the substrate is cut into sliders, and the steps including polishing of the medium facing surface 30 and fabrication of flying rails are performed. The magnetic head is thus completed.

Modification Examples

Figure 33:
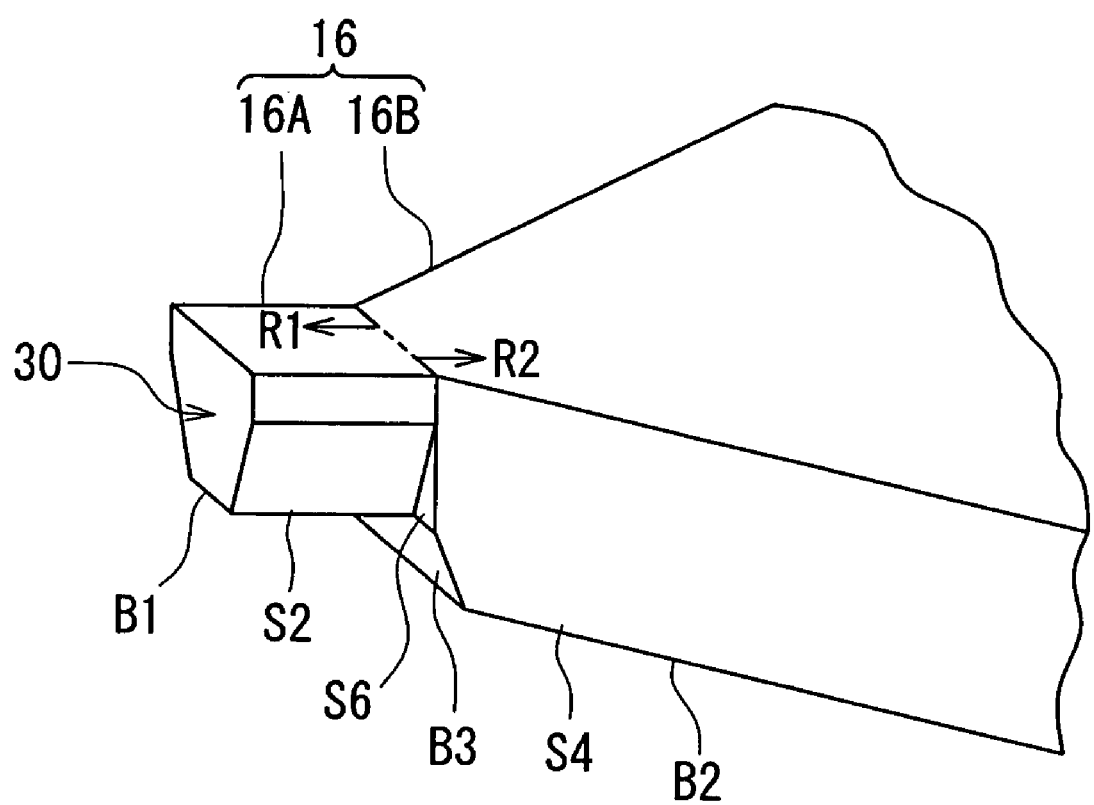
FIG. 33 is a perspective view illustrating a portion of a pole layer of a first modification example of the third embodiment of the invention.
Figure 34:
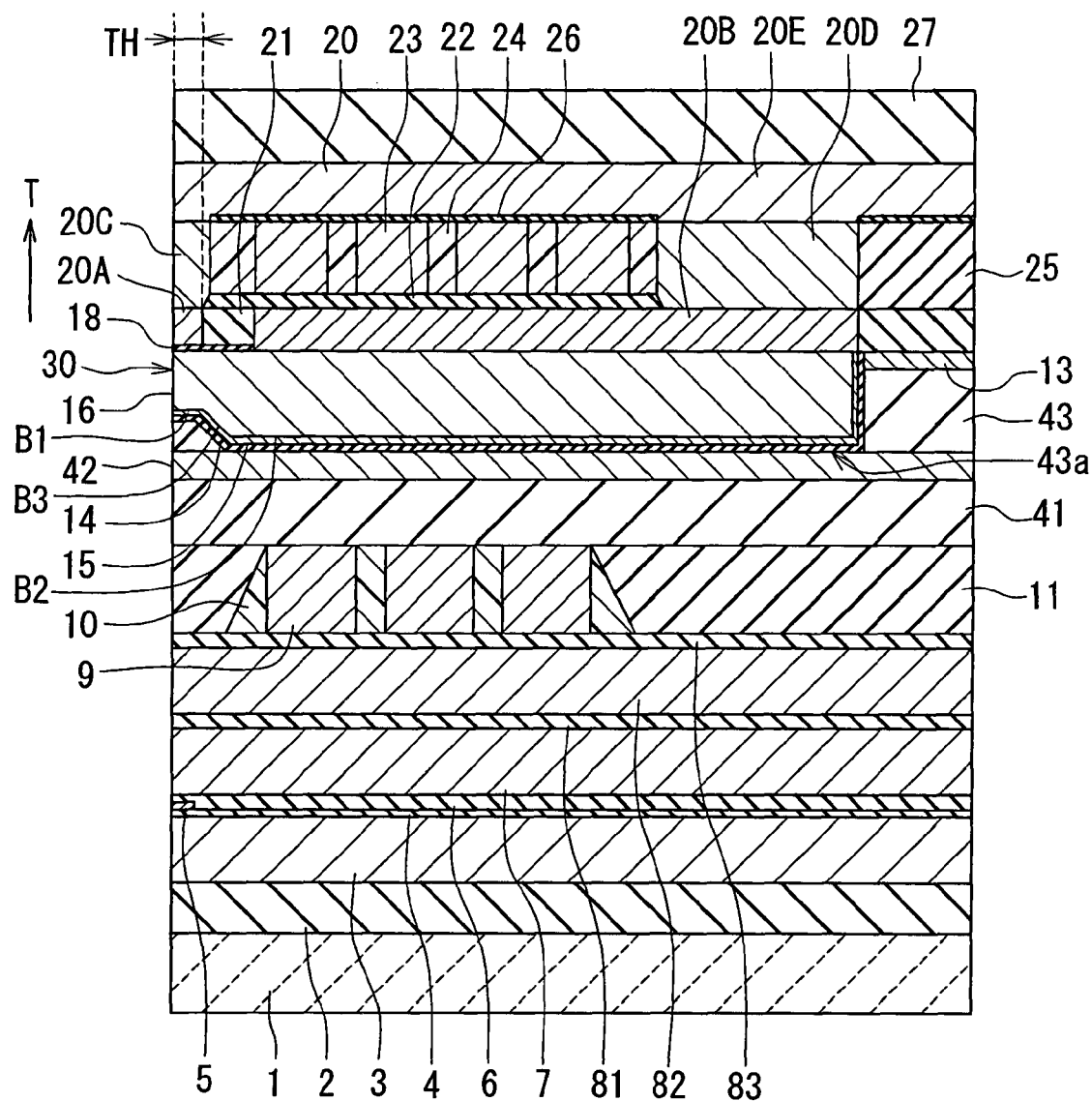
FIG. 34 is a cross-sectional view for illustrating the configuration of a magnetic head of the first modification example of the third embodiment of the invention.
Figure 35:
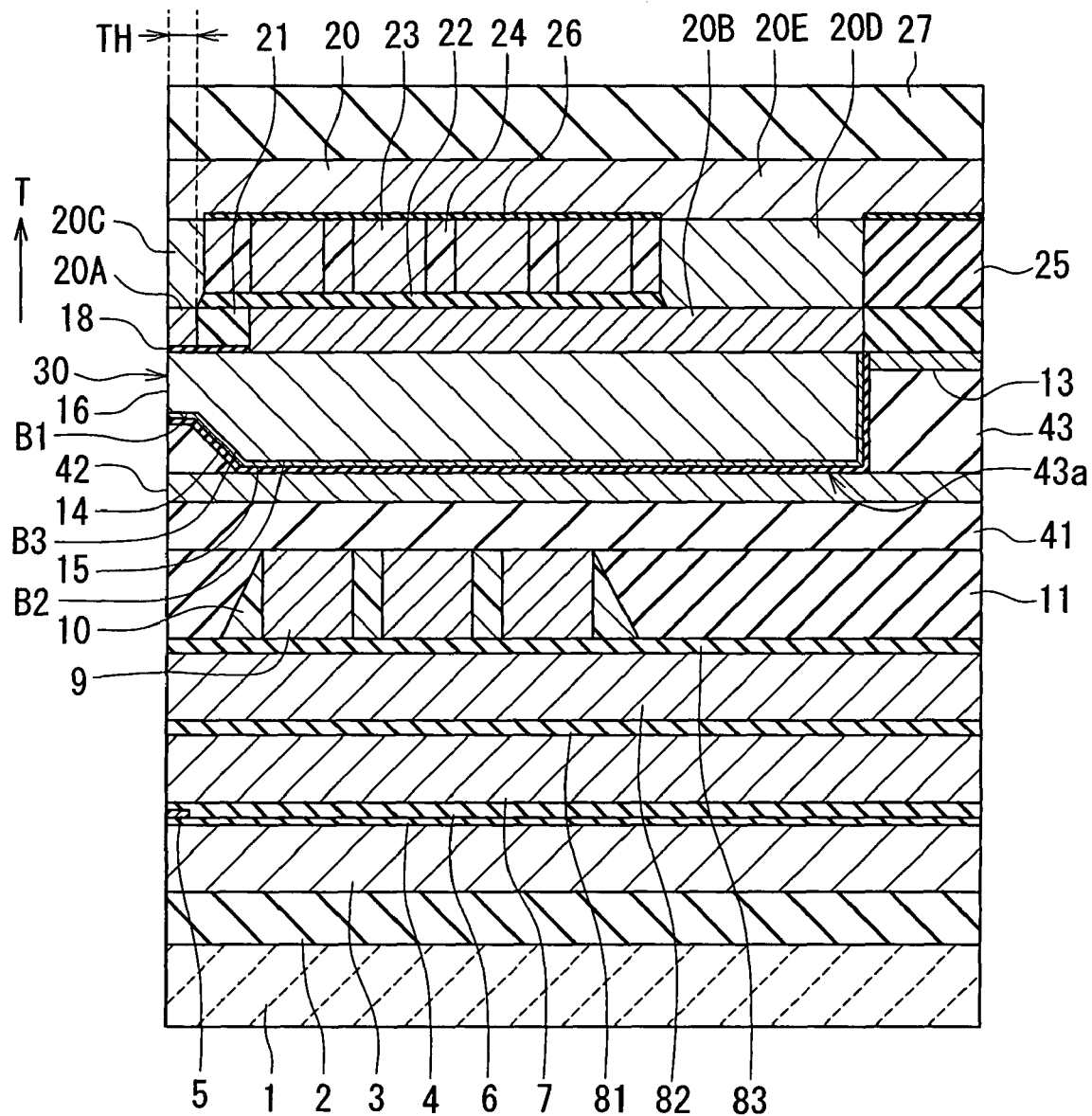
FIG. 35 is a cross-sectional view for illustrating the configuration of a magnetic head of a second modification example of the third embodiment of the invention.

Reference is now made to FIG. 33 to FIG. 35 to describe first and second modification examples of the third embodiment. FIG. 33 is a perspective view illustrating a portion of the pole layer 16 of the first modification example. FIG. 34 is a cross-sectional view illustrating the configuration of a magnetic head of the first modification example. FIG. 35 is a cross-sectional view illustrating the configuration of a magnetic head of the second modification example.

In the first modification example shown in FIG. 33 and FIG. 34, the portion of the pole layer 16 located in the first region R1 has the first bottom surface B1 that is a surface closest to the top surface of the substrate 1, the portion of the pole layer 16 located in the second region R2 has the second bottom surface B2 that is a surface closest to the top surface of the substrate 1, and the second bottom surface B2 is located closer to the top surface of the substrate 1 than the first bottom surface B1. The pole layer 16 further has the surface B3 that couples the bottom surfaces B1 and B2 to each other.

In the first modification example, part of a portion of the encasing groove 43a located in the second region R2 penetrates the encasing layer 43 while a portion of the encasing groove 43a located in the first region R1 does not penetrate the encasing layer 43. The bottom of the portion of the encasing groove 43a that penetrates the encasing layer 43 is formed of the top surface of the bottom forming layer 42.

In a method of manufacturing the magnetic head of the first modification example, in the first etching step, the nonmagnetic layer 43P is etched such that the bottom of a portion of the initial groove 43Pa located in the second region R2 reaches the top surface of the bottom forming layer 42 but the bottom of a portion of the initial groove 43Pa located in the first region R1 will not reach the top surface of the bottom forming layer 42. The maximum depth of the encasing groove 43a is thereby defined in the first etching step.

In the second modification example shown in FIG. 35, as in the first modification example, the portion of the pole layer 16 located in the first region R1 has the first bottom surface B1 that is a surface closest to the top surface of the substrate 1, the portion of the pole layer 16 located in the second region R2 has the second bottom surface B2 that is a surface closest to the top surface of the substrate 1, and the second bottom surface B2 is located closer to the top surface of the substrate 1 than the first bottom surface B1. The pole layer 16 further has the surface B3 that couples the bottom surfaces B1 and B2 to each other.

In the second modification example, part of the portion of the encasing groove 43a located in the second region R2 penetrates the encasing layer 43 while the portion of the encasing groove 43a located in the first region R1 does not penetrate the encasing layer 43. The bottom of the portion of the encasing groove 43a that penetrates the encasing layer 43 is formed of the top surface of the bottom forming layer 42. In the second modification example, the bottom forming layer 42 is located closer to the top surface of the substrate 1 than in the first modification example.

In a method of manufacturing the magnetic head of the second modification example, in the first etching step, the nonmagnetic layer 43P is etched such that the entire bottom of the initial groove 43Pa will not reach the top surface of the bottom forming layer 42. In the second etching step, the initial groove 43Pa is etched such that the bottom of the portion of the encasing groove 43a located in the second region R2 reaches the top surface of the bottom forming layer 42 but the bottom of the portion of the encasing groove 43a located in the first region R1 will not reach the top surface of the bottom forming layer 42. In the second modification example, the maximum depth of the encasing groove 43a is thereby defined in the second etching step.

According to the third embodiment, it is possible to precisely control the maximum depth of the encasing groove 43a by the bottom forming layer 42. It is thereby possible to precisely control the thickness of the pole layer 16.

The remainder of configuration, function and effects of the third embodiment are similar to those of the first embodiment. Modifications of the third embodiment similar to the first to fourth modification examples of the first embodiment are also possible. In the third embodiment, the first and second top surfaces T1 and T2 may be formed in the pole layer 16 as in the second embodiment.

The present invention is not limited to the foregoing embodiments but may be practiced in still other ways. For example, a coil wound around the pole layer 16 in a helical manner may be provided in each of the embodiments in place of the flat-whorl-shaped coils 9 and 23.

While the magnetic head disclosed in the embodiments has such a configuration that the read head is formed on the base body and the write head is stacked on the read head, it is also possible that the read head is stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:
    a medium facing surface that faces toward a recording medium;
    a coil for generating a magnetic field corresponding to data to be written on the recording medium;
    a pole layer allowing a magnetic flux corresponding to the field generated by the coil to pass therethrough, and generating a write magnetic field for writing the data on the recording medium by means of a perpendicular magnetic recording system; and
    a substrate on which the pole layer and the coil are stacked, wherein:
    the pole layer includes: a track width defining portion having an end face located in the medium facing surface and an end opposite to the end face; and a wide portion connected to the end of the track width defining portion;
    the track width defining portion has a first top surface that is a surface farthest from a top surface of the substrate;
    the wide portion has a second top surface that is a surface farthest from the top surface of the substrate;
    the second top surface has a width greater than that of the first top surface;
    the end face of the track width defining portion located in the medium facing surface has a first side closest to the substrate and a second side opposite to the first side, the second side defining a track width, the end face of the track width defining portion located in the medium facing surface having a width that decreases with decreasing distance from the first side;
    the pole layer further includes: a first side surface and a second side surface located opposite to each other in a first region that extends from the medium facing surface to a position at a distance within a range of 10 to 300 nm inclusive from the medium facing surface; a third side surface and a fourth side surface located in a second region other than the first region; a fifth side surface located at a boundary between the first region and the second region and connecting the first side surface and the third side surface to each other; and a sixth side surface located at the boundary between the first region and the second region and connecting the second side surface and the fourth side surface to each other;
    a distance between the first and second side surfaces taken in a direction of track width decreases with decreasing distance from a top surface of the substrate;
    at the boundary between the first and second regions, a distance between the third and fourth side surfaces taken in the direction of track width at a position closest to the top surface of the substrate is greater than the distance between the first and second side surfaces taken in the direction of track width at a position closest to the top surface of the substrate; and
    each of the fifth and sixth side surfaces has a width that increases with decreasing distance from the top surface of the substrate,
    the magnetic head further comprising: an encasing layer made of a nonmagnetic material and having an encasing groove that opens in a top surface thereof, and an encasing groove defining layer disposed on the top surface of the encasing layer and having a penetrating opening contiguous to the encasing groove, wherein an edge of the opening of the encasing grove defining layer is located directly above an edge of the encasing groove in the top surface of the encasing layer, and at least part of the pole layer is placed in the encasing groove of the encasing layer.

2. The magnetic head according to claim 1, wherein:
    an angle formed by the third side surface with respect to a direction orthogonal to the top surface of the substrate is smaller than an angle formed by the first side surface with respect to the direction orthogonal to the top surface of the substrate; and
    an angle formed by the fourth side surface with respect to the direction orthogonal to the top surface of the substrate is smaller than an angle formed by the second side surface with respect to the direction orthogonal to the top surface of the substrate.

3. The magnetic head according to claim 1, wherein the distance between the third and fourth side surfaces taken in the direction of track width increases with decreasing distance from the top surface of the substrate.

4. The magnetic head according to claim 1, wherein a distance from the medium facing surface to the boundary between the first and second regions is equal to a distance from the medium facing surface to a boundary between the track width defining portion and the wide portion.

5. The magnetic head according to claim 1, wherein a distance from the medium facing surface to the boundary between the first and second regions is smaller than a distance from the medium facing surface to a boundary between the track width defining portion and the wide portion.

6. The magnetic head according to claim 1, wherein a distance from the medium facing surface to the boundary between the first and second regions is greater than a distance from the medium facing surface to a boundary between the track width defining portion and the wide portion.

7. The magnetic head according to claim 1, wherein the encasing groove defining layer is made of SiC.

8. The magnetic head according to claim 1, further comprising a bottom forming layer made of a nonmagnetic material, the bottom forming layer being disposed between the encasing layer and the substrate and touching the encasing layer, wherein at least part of a portion of the encasing groove located in the second region penetrates the encasing layer.

9. The magnetic head according to claim 8, wherein the bottom forming layer is made of SiC.

10. The magnetic head according to claim 1, further comprising a nonmagnetic film made of a nonmagnetic material and disposed between the encasing layer and the pole layer in the encasing groove.

11. The magnetic head according to claim 1, wherein: a portion of the pole layer located in the first region has a first bottom surface that is a surface closest to the top surface of the substrate; a portion of the pole layer located in the second region has a second bottom surface that is a surface closest to the top surface of the substrate; and the second bottom surface is located closer to the top surface of the substrate than the first bottom surface.

12. The magnetic head according to claim 1, wherein the second top surface is located farther from the top surface of the substrate than the first top surface.

13. A method of manufacturing a magnetic head for perpendicular magnetic recording, the magnetic head comprising:
  a medium facing surface that faces toward a recording medium;
  a coil for generating a magnetic field corresponding to data to be written on the recording medium;
  a pole layer allowing a magnetic flux corresponding to the field generated by the coil to pass therethrough, and generating a write magnetic field for writing the data on the recording medium by means of a perpendicular magnetic recording system;
  an encasing layer made of a nonmagnetic material and having an encasing groove that opens in a top surface thereof;
  an encasing groove defining layer disposed on the top surface of the encasing layer and having a penetrating opening contiguous to the encasing groove; and
  a substrate on which the encasing layer, the encasing groove defining layer, the pole layer, and the coil are stacked, wherein:
  an edge of the opening of the encasing groove defining layer is located directly above an edge of the encasing groove in the top surface of the encasing layer, and at least part of the pole layer is placed in the encasing groove of the encasing layer;
  the pole layer includes: a track width defining portion having an end face located in the medium facing surface and an end opposite to the end face; and a wide portion connected to the end of the track width defining portion;
  the track width defining portion has a first top surface that is a surface farthest from a top surface of the substrate;
  the wide portion has a second top surface that is a surface farthest from the top surface of the substrate;
  the second top surface has a width greater than that of the first top surface;
  the end face of the track width defining portion located in the medium facing surface has a first side closest to the substrate and a second side opposite to the first side, the second side defining a track width, the end face of the track width defining portion located in the medium facing surface having a width that decreases with decreasing distance from the first side;
  the pole layer further includes: a first side surface and a second side surface located opposite to each other in a first region that extends from the medium facing surface to a position at a distance within a range of 10 to 300 nm inclusive from the medium facing surface; a third side surface and a fourth side surface located in a second region other than the first region; a fifth side surface located at a boundary between the first region and the second region and connecting the first side surface and the third side surface to each other; and a sixth side surface located at the boundary between the first region and the second region and connecting the second side surface and the fourth side surface to each other;
  a distance between the first and second side surfaces taken in a direction of track width decreases with decreasing distance from a top surface of the substrate;
  at the boundary between the first and second regions, a distance between the third and fourth side surfaces taken in the direction of track width at a position closest to the top surface of the substrate is greater than the distance between the first and second side surfaces taken in the direction of track width at a position closest to the top surface of the substrate; and
  each of the fifth and sixth side surfaces has a width that increases with decreasing distance from the top surface of the substrate, the method comprising:
  the step of forming a nonmagnetic layer that is to be the encasing layer later by undergoing formation of the encasing groove therein;
  the step of forming the encasing groove defining layer on the nonmagnetic layer;
  the first etching step in which an initial groove that is to be the encasing groove later by undergoing etching is formed in the nonmagnetic layer by selectively etching a portion of the nonmagnetic layer exposed from the opening of the encasing groove defining layer;
  the step of forming a mask on portions of the encasing groove defining layer and the initial groove that are located in the first region;
  the second etching step of completing the encasing groove by etching a portion of the initial groove that is not covered with the mask by using the mask and the encasing groove defining layer as etching masks;
  the step of forming the pole layer so that at least part of the pole layer is placed in the encasing groove; and
  the step of forming the coil, wherein:

portions of the encasing groove that are to be opposed to the first and second side surfaces of the pole layer are formed through the first etching step; and portions of the encasing groove that are to be opposed to the third to sixth side surfaces of the pole layer are formed through the second etching step.

14. The method according to claim 13, wherein:

an angle formed by the third side surface with respect to a direction orthogonal to the top surface of the substrate is smaller than an angle formed by the first side surface with respect to the direction orthogonal to the top surface of the substrate; and an angle formed by the fourth side surface with respect to the direction orthogonal to the top surface of the substrate is smaller than an angle formed by the second side surface with respect to the direction orthogonal to the top surface of the substrate.

15. The method according to claim 13, wherein the distance between the third and fourth side surfaces taken in the direction of track width increases with decreasing distance from the top surface of the substrate.

16. The method according to claim 13, wherein a distance from the medium facing surface to the boundary between the first and second regions is equal to a distance from the medium facing surface to a boundary between the track width defining portion and the wide portion.

17. The method according to claim 13, wherein a distance from the medium facing surface to the boundary between the first and second regions is smaller than a distance from the medium facing surface to a boundary between the track width defining portion and the wide portion.

18. The method according to claim 13, wherein a distance from the medium facing surface to the boundary between the first and second regions is greater than a distance from the medium facing surface to a boundary between the track width defining portion and the wide portion.

19. The method according to claim 13, wherein the encasing groove defining layer is made of SiC.

20. The method according to claim 13, the magnetic head further comprising a bottom forming layer made of a nonmagnetic material, the bottom forming layer being disposed between the encasing layer and the substrate and touching the encasing layer, wherein at least part of a portion of the encasing groove located in the second region penetrates the encasing layer, the method further comprising the step of forming the bottom forming layer performed before the nonmagnetic layer is formed.

21. The method according to claim 20, wherein the bottom forming layer is made of SiC.

22. The method according to claim 20, wherein, in the first etching step, the nonmagnetic layer is etched so that an entire bottom of the initial groove reaches a top surface of the bottom forming layer.

23. The method according to claim 20, wherein, in the first etching step, the nonmagnetic layer is etched so that a bottom of a portion of the initial groove located in the second region reaches a top surface of the bottom forming layer while a bottom of a portion of the initial groove located in the first region will not reach the top surface of the bottom forming layer.

24. The method according to claim 20, wherein: in the first etching step, the nonmagnetic layer is etched so that an entire bottom of the initial groove will not reach a top surface of the bottom forming layer; and, in the second etching step, the initial groove is etched so that a bottom of the portion of the encasing groove located in the second region reaches the top surface of the bottom forming layer while a bottom of a portion of the encasing groove located in the first region will not reach the top surface of the bottom forming layer.

25. The method according to claim 13, the magnetic head further comprising a nonmagnetic film made of a nonmagnetic material and disposed between the encasing layer and the pole layer in the encasing groove, the method further comprising the step of forming the nonmagnetic film performed between the second etching step and the step of forming the pole layer.

26. The method according to claim 13, wherein: a portion of the pole layer located in the first region has a first bottom surface that is a surface closest to the top surface of the substrate; a portion of the pole layer located in the second region has a second bottom surface that is a surface closest to the top surface of the substrate; and the second bottom surface is located closer to the top surface of the substrate than the first bottom surface.

27. The method according to claim 13, wherein the second top surface is located farther from the top surface of the substrate than the first top surface.

* * * * *